(12) United States Patent
Zhang et al.

(10) Patent No.: US 8,725,477 B2
(45) Date of Patent: May 13, 2014

(54) METHOD TO GENERATE NUMERICAL PSEUDOCORES USING BOREHOLE IMAGES, DIGITAL ROCK SAMPLES, AND MULTI-POINT STATISTICS

(75) Inventors: Tuanfeng Zhang, Lexington, MA (US); Neil Francis Hurley, Boston, MA (US); Weishu Zhao, Quincy, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 799 days.

(21) Appl. No.: 12/384,721

(22) Filed: Apr. 8, 2009

(65) Prior Publication Data

US 2009/0259446 A1 Oct. 15, 2009

Related U.S. Application Data

(60) Provisional application No. 61/044,018, filed on Apr. 10, 2008, provisional application No. 61/044,031, filed on Apr. 10, 2008.

(51) Int. Cl.
*G06G 7/48* (2006.01)
*E21B 49/00* (2006.01)
*E21B 47/00* (2012.01)
*G01V 1/44* (2006.01)

(52) U.S. Cl.
CPC ............... *E21B 49/00* (2013.01); *E21B 47/00* (2013.01); *G01V 1/44* (2013.01); *G06F 2217/10* (2013.01)
USPC .................................. 703/10; 703/6; 73/152

(58) Field of Classification Search
CPC ..... G06F 17/5009; G06F 22/17; G06F 17/10; G06F 2217/10; G06G 17/50; G06G 7/50; E21B 49/00; E21B 47/00; G01V 1/44
USPC ......... 703/10, 6, 2; 73/152; 367/86; 345/419; 702/11
See application file for complete search history.

(56) References Cited

U.S. PATENT DOCUMENTS 3,013,467 A 12/1961 Minsky
3,406,776 A 10/1968 Henry
(Continued)

FOREIGN PATENT DOCUMENTS

DE 102004043992 A1 3/2006
EP 0114728 A2 8/1984
(Continued)

OTHER PUBLICATIONS

Caers, Jef et al., "Stochastic Reservoir Simulation Using Neural Networks Trained on Outcrop Data", Sep. 27-30, 1998, SPE Annual Technical Conference and Exhibition, Society of Petroleum Engineers.*

(Continued)

*Primary Examiner* — Kamini S Shah
*Assistant Examiner* — Cedric D Johnson
(74) *Attorney, Agent, or Firm* — Bridget Laffey; Jakub M. Michna

(57) ABSTRACT

Methods and systems for creating a numerical pseudocore model, comprising: a) obtaining logging data from a reservoir having depth-defined intervals of the reservoir, and processing the logging data into interpretable borehole image data having unidentified borehole image data; b) examining one of the interpretable borehole image data, other processed logging data or both to generate the unidentified borehole image data, processing the generated unidentified borehole image data into the interpretable borehole image data to generate warped fullbore image data; c) collecting one of a core from the reservoir, the logging data or both and generating a digital core data from one of the collected core, the logging data or both such that generated digital core data represents features of one or more depth-defined interval of the reservoir; and d) processing generated digital core data, interpretable borehole image data or the logging data to generate realizations of the numerical pseudocore model.

31 Claims, 15 Drawing Sheets
(12 of 15 Drawing Sheet(s) Filed in Color)

(56) References Cited

U.S. PATENT DOCUMENTS

| | | |
|---|---|---|
| 3,469,311 A | 9/1969 | Benthuysen et al. |
| 4,079,421 A | 3/1978 | Kermisch |
| 4,124,302 A | 11/1978 | Kuzmin |
| 4,480,921 A | 11/1984 | Leveque et al. |
| 4,483,619 A | 11/1984 | Leveque et al. |
| 4,555,181 A | 11/1985 | Klumper et al. |
| 4,567,759 A | 2/1986 | Ekstrom et al. |
| 4,702,607 A | 10/1987 | Kinameri |
| 4,734,578 A | 3/1988 | Horikawa |
| 4,750,888 A | 6/1988 | Allard et al. |
| 4,758,088 A | 7/1988 | Doyle |
| 4,783,751 A | 11/1988 | Ehrlich et al. |
| 4,821,164 A | 4/1989 | Swanson |
| 4,863,252 A | 9/1989 | McCarthy et al. |
| 4,868,883 A | 9/1989 | Chen |
| 4,877,960 A | 10/1989 | Messerschmidt et al. |
| 4,912,683 A | 3/1990 | Katahara et al. |
| 4,927,254 A | 5/1990 | Kino et al. |
| 4,972,258 A | 11/1990 | Wolf et al. |
| 4,997,242 A | 3/1991 | Amos |
| 5,022,743 A | 6/1991 | Kino et al. |
| 5,032,720 A | 7/1991 | White |
| 5,144,477 A | 9/1992 | White |
| 5,162,941 A | 11/1992 | Favro et al. |
| RE34,214 E | 4/1993 | Carlsson et al. |
| 5,200,705 A | 4/1993 | Clark et al. |
| 5,220,403 A | 6/1993 | Batchelder et al. |
| 5,239,178 A | 8/1993 | Derndinger et al. |
| 5,283,684 A | 2/1994 | Thomas et al. |
| 5,289,407 A | 2/1994 | Strickler et al. |
| 5,334,830 A | 8/1994 | Fakuyama et al. |
| 5,356,110 A | 10/1994 | Eddy |
| 5,463,897 A | 11/1995 | Prater et al. |
| 5,479,252 A | 12/1995 | Worster et al. |
| 5,537,247 A | 7/1996 | Xiao |
| 5,557,452 A | 9/1996 | Harris |
| 5,560,244 A | 10/1996 | Prater et al. |
| 5,587,832 A | 12/1996 | Krause |
| 5,659,420 A | 8/1997 | Wakai et al. |
| 5,675,443 A | 10/1997 | Dorsel |
| 5,713,364 A | 2/1998 | DeBaryshe et al. |
| 5,714,682 A | 2/1998 | Prater et al. |
| 5,777,342 A | 7/1998 | Baer |
| 5,809,163 A | 9/1998 | Delhomme et al. |
| 5,813,987 A | 9/1998 | Modell et al. |
| 5,814,820 A | 9/1998 | Dong et al. |
| 5,838,634 A | 11/1998 | Jones et al. |
| 5,866,911 A | 2/1999 | Baer |
| 5,887,009 A | 3/1999 | Mandella et al. |
| 5,923,465 A | 7/1999 | Byrd |
| 5,923,466 A | 7/1999 | Krause et al. |
| 5,939,709 A | 8/1999 | Ghislain et al. |
| 5,952,668 A | 9/1999 | Baer |
| 6,009,065 A | 12/1999 | Glushko et al. |
| 6,011,557 A | 1/2000 | Keskes et al. |
| 6,025,985 A | 2/2000 | Leytes et al. |
| 6,033,100 A | 3/2000 | Marquiss et al. |
| 6,071,748 A | 6/2000 | Modln et al. |
| 6,088,656 A | 7/2000 | Ramakrishnan et al. |
| 6,097,025 A | 8/2000 | Modlin et al. |
| 6,098,031 A | 8/2000 | Svetkoff et al. |
| 6,104,945 A | 8/2000 | Modell et al. |
| 6,125,079 A | 9/2000 | Borchak et al. |
| 6,133,986 A | 10/2000 | Johnson |
| 6,148,114 A | 11/2000 | Han |
| 6,159,425 A | 12/2000 | Edwards et al. |
| 6,177,998 B1 | 1/2001 | Svetkoff et al. |
| 6,181,425 B1 | 1/2001 | Svetkoff et al. |
| 6,185,030 B1 | 2/2001 | Overbeck |
| 6,187,267 B1 | 2/2001 | Taylor et al. |
| 6,201,639 B1 | 3/2001 | Overbeck |
| 6,248,988 B1 | 6/2001 | Krantz |
| 6,249,347 B1 | 6/2001 | Svetkoff et al. |
| 6,259,104 B1 | 7/2001 | Baer |
| 6,287,595 B1 | 9/2001 | Loewy et al. |
| 6,288,782 B1 | 9/2001 | Worster et al. |
| 6,297,018 B1 | 10/2001 | French et al. |
| 6,309,948 B1 | 10/2001 | Lin et al. |
| 6,313,960 B2 | 11/2001 | Marquiss et al. |
| 6,316,153 B1 | 11/2001 | Goodman et al. |
| 6,317,207 B2 | 11/2001 | French et al. |
| 6,326,605 B1 | 12/2001 | Modlin et al. |
| 6,335,824 B1 | 1/2002 | Overbeck |
| 6,366,357 B1 | 4/2002 | Svetkoff et al. |
| 6,385,484 B2 | 5/2002 | Nordstrom et al. |
| 6,411,838 B1 | 6/2002 | Nordstrom et al. |
| 6,452,686 B1 | 9/2002 | Svetkoff et al. |
| 6,466,316 B2 | 10/2002 | Modlin et al. |
| 6,469,311 B1 | 10/2002 | Modlin et al. |
| 6,483,582 B2 | 11/2002 | Modlin et al. |
| 6,488,892 B1 | 12/2002 | Burton et al. |
| 6,498,335 B2 | 12/2002 | Modlin et al. |
| 6,499,366 B1 | 12/2002 | Meadows et al. |
| 6,516,080 B1 | 2/2003 | Nur |
| 6,545,264 B1 | 4/2003 | Stern |
| 6,548,796 B1 | 4/2003 | Silvermintz et al. |
| 6,548,810 B2 | 4/2003 | Zaluzec |
| 6,576,476 B1 | 6/2003 | Taylor et al. |
| 6,657,216 B1 | 12/2003 | Poris |
| 6,661,515 B2 | 12/2003 | Worster et al. |
| 6,710,316 B2 | 3/2004 | Mandella et al. |
| 6,713,742 B2 | 3/2004 | Mandella et al. |
| 6,713,772 B2 | 3/2004 | Goodman et al. |
| 6,714,682 B2 | 3/2004 | Kaneda |
| 6,750,974 B2 | 6/2004 | Svetkoff et al. |
| 6,756,202 B2 | 6/2004 | Dorsel et al. |
| 6,760,613 B2 | 7/2004 | Nordstrom et al. |
| 6,768,918 B2 | 7/2004 | Zelenchuk |
| 6,791,690 B2 | 9/2004 | Corson et al. |
| 6,816,787 B2 * | 11/2004 | Ramamoorthy et al. ......... 702/7 |
| 6,818,903 B2 | 11/2004 | Schomacker et al. |
| 6,821,787 B2 | 11/2004 | Neilson et al. |
| 6,825,921 B1 | 11/2004 | Modlin et al. |
| 6,826,422 B1 | 11/2004 | Modell et al. |
| 6,826,520 B1 | 11/2004 | Khan et al. |
| 6,835,574 B2 | 12/2004 | Neilson et al. |
| 6,839,661 B2 | 1/2005 | Costa et al. |
| 6,844,123 B1 | 1/2005 | Ekberg et al. |
| 6,845,325 B2 | 1/2005 | Valero et al. |
| 6,847,460 B2 | 1/2005 | Farrell et al. |
| 6,847,490 B1 | 1/2005 | Nordstrom et al. |
| 6,864,097 B1 | 3/2005 | Schembri et al. |
| 6,876,781 B2 | 4/2005 | Khoury |
| 6,883,158 B1 | 4/2005 | Sandstrom et al. |
| 6,886,632 B2 | 5/2005 | Raghuraman et al. |
| 6,897,405 B2 | 5/2005 | Cheng et al. |
| 6,902,935 B2 | 6/2005 | Kaufman et al. |
| 6,903,347 B2 | 6/2005 | Baer |
| 6,913,603 B2 | 7/2005 | Knopp et al. |
| 6,917,468 B2 | 7/2005 | Thomas |
| 6,933,154 B2 | 8/2005 | Schomacker et al. |
| 6,937,023 B2 | 8/2005 | McElhinney |
| 6,942,873 B2 | 9/2005 | Russell et al. |
| 6,943,968 B2 | 9/2005 | Nielson et al. |
| 6,952,668 B1 | 10/2005 | Kapilow |
| 6,982,431 B2 | 1/2006 | Modlin et al. |
| 6,987,570 B1 | 1/2006 | Schmit et al. |
| 6,991,765 B2 | 1/2006 | Neilson et al. |
| 6,992,761 B2 | 1/2006 | Modlin et al. |
| 7,005,306 B1 | 2/2006 | Poris |
| 7,018,842 B2 | 3/2006 | Dorsel et al. |
| 7,042,647 B2 | 5/2006 | Lo |
| 7,045,362 B2 | 5/2006 | Hartwich et al. |
| 7,068,583 B2 | 6/2006 | Khoury |
| 7,071,477 B2 | 7/2006 | Baer |
| 7,075,100 B2 | 7/2006 | Saccomanno et al. |
| 7,092,107 B2 | 8/2006 | Babayoff et al. |
| 7,103,401 B2 | 9/2006 | Schomacker et al. |
| 7,127,282 B2 | 10/2006 | Nordstrom et al. |
| 7,133,779 B2 | 11/2006 | Tilke et al. |
| 7,136,518 B2 | 11/2006 | Griffin et al. |
| 7,140,119 B2 | 11/2006 | Badami et al. |
| 7,154,605 B2 | 12/2006 | Worster et al. |
| 7,158,228 B2 | 1/2007 | Psaltis et al. |

(56) References Cited

U.S. PATENT DOCUMENTS

| | | |
|---|---|---|
| 7,187,810 B2 | 3/2007 | Clune et al. |
| 7,187,816 B2 | 3/2007 | Huang |
| 7,199,882 B2 | 4/2007 | Svetkoff et al. |
| 7,205,553 B2 | 4/2007 | Dorsel et al. |
| 7,224,162 B2 | 5/2007 | Proett et al. |
| 7,230,725 B2 | 6/2007 | Babayoff et al. |
| 7,251,398 B2 | 7/2007 | Baets et al. |
| 7,260,248 B2 | 8/2007 | Kaufman et al. |
| 7,262,889 B2 | 8/2007 | Sun et al. |
| 7,280,203 B2 | 10/2007 | Olschewski |
| 7,309,867 B2 | 12/2007 | Costa et al. |
| 7,310,547 B2 | 12/2007 | Zelenchuk |
| 7,312,919 B2 | 12/2007 | Overbeck |
| 7,324,710 B2 | 1/2008 | Andersson et al. |
| 7,330,273 B2 | 2/2008 | Podoleanu et al. |
| 7,345,975 B2 | 3/2008 | Fadeyev et al. |
| 7,363,158 B2 | 4/2008 | Stelting et al. |
| 7,365,858 B2 | 4/2008 | Fang-Yen et al. |
| 7,376,068 B1 | 5/2008 | Khoury |
| 7,384,806 B2 | 6/2008 | Worster et al. |
| 7,444,616 B2 | 10/2008 | Sandstrom et al. |
| 7,474,407 B2 | 1/2009 | Gutin |
| 7,483,152 B2 | 1/2009 | Jovancicevic et al. |
| 7,516,055 B2 | 4/2009 | Strebelle |
| 7,538,879 B2 | 5/2009 | Power |
| 7,545,510 B2 | 6/2009 | Lee et al. |
| 7,557,581 B2 | 7/2009 | Ostermeier et al. |
| 7,630,517 B2 | 12/2009 | Mirowski et al. |
| 7,718,351 B2 | 5/2010 | Ying et al. |
| 7,765,091 B2 | 7/2010 | Lee et al. |
| 7,783,462 B2 | 8/2010 | Landis, Jr. et al. |
| 7,933,757 B2 | 4/2011 | Awwiller |
| 8,045,153 B2 | 10/2011 | Mimura et al. |
| 8,311,788 B2 | 11/2012 | Hurley et al. |
| 2002/0031477 A1 | 3/2002 | Loewy et al. |
| 2005/0002319 A1 | 1/2005 | Fadeyev et al. |
| 2005/0010799 A1 | 1/2005 | Kelley et al. |
| 2005/0057756 A1 | 3/2005 | Fang-Yen et al. |
| 2005/0105097 A1 | 5/2005 | Fang-Yen et al. |
| 2005/0128488 A1 | 6/2005 | Yelin et al. |
| 2005/0192966 A1 | 9/2005 | Hilbert et al. |
| 2005/0202660 A1 | 9/2005 | Cohen et al. |
| 2005/0213430 A1 | 9/2005 | Jovancicevic et al. |
| 2005/0231727 A1 | 10/2005 | Podoleanu et al. |
| 2005/0235507 A1 | 10/2005 | Badami et al. |
| 2006/0038571 A1 | 2/2006 | Ostermeier et al. |
| 2006/0041410 A1* | 2/2006 | Strebelle ............ 703/10 |
| 2006/0045421 A1 | 3/2006 | Baets et al. |
| 2006/0102486 A1 | 5/2006 | Bentley et al. |
| 2006/0126991 A1 | 6/2006 | Huang |
| 2006/0132790 A1 | 6/2006 | Gutin |
| 2006/0136419 A1 | 6/2006 | Brydon et al. |
| 2006/0141617 A1 | 6/2006 | Desai et al. |
| 2006/0193777 A1 | 8/2006 | Southall et al. |
| 2006/0238842 A1 | 10/2006 | Sun et al. |
| 2006/0256343 A1 | 11/2006 | Choma et al. |
| 2007/0014435 A1 | 1/2007 | Mirowski et al. |
| 2007/0165241 A1 | 7/2007 | Bertran et al. |
| 2007/0203677 A1 | 8/2007 | Awwiller |
| 2007/0213942 A1 | 9/2007 | Ponson et al. |
| 2007/0216989 A1 | 9/2007 | Nerin et al. |
| 2007/0239359 A1* | 10/2007 | Stelting et al. ............ 702/6 |
| 2007/0265813 A1 | 11/2007 | Unal et al. |
| 2008/0057479 A1 | 3/2008 | Grenness |
| 2008/0123106 A1 | 5/2008 | Zeng et al. |
| 2008/0218850 A1 | 9/2008 | Power |
| 2008/0266548 A1 | 10/2008 | Lee et al. |
| 2009/0062496 A1 | 3/2009 | Shaffer et al. |
| 2009/0104549 A1 | 4/2009 | Sandstrom et al. |
| 2009/0114544 A1 | 5/2009 | Rousseau et al. |
| 2009/0164182 A1 | 6/2009 | Pedersen |
| 2009/0262603 A1 | 10/2009 | Hurley |
| 2009/0299714 A1 | 12/2009 | Kelkar et al. |
| 2011/0004446 A1 | 1/2011 | Dorn et al. |
| 2011/0004447 A1 | 1/2011 | Hurley |
| 2011/0004448 A1 | 1/2011 | Hurley |
| 2011/0181701 A1 | 7/2011 | Varslot et al. |

FOREIGN PATENT DOCUMENTS

| | | |
|---|---|---|
| EP | 0147316 B1 | 10/1991 |
| EP | 1630578 A2 | 3/2006 |
| EP | 1739471 A1 | 1/2007 |
| EP | 1805477 A1 | 7/2007 |
| EP | 1739471 B1 | 9/2007 |
| EP | 1098166 B1 | 12/2008 |
| EP | 2056381 B1 | 6/2012 |
| GB | 2439778 A | 1/2008 |
| WO | 0041006 A1 | 7/2000 |
| WO | 0107891 A2 | 2/2001 |
| WO | 0173431 A2 | 10/2001 |
| WO | 2004046337 A2 | 6/2004 |
| WO | 2005001445 A2 | 1/2005 |
| WO | 2005052220 A1 | 6/2005 |
| WO | 2005054780 A1 | 6/2005 |
| WO | 2005077255 A1 | 8/2005 |
| WO | 2005085804 A1 | 9/2005 |
| WO | 2005096061 A1 | 10/2005 |
| WO | 2005103827 A1 | 11/2005 |
| WO | 2005108911 A1 | 11/2005 |
| WO | 2005108965 | 11/2005 |
| WO | 2006021205 A1 | 3/2006 |
| WO | 2006042696 A1 | 4/2006 |
| WO | 2006065772 A2 | 6/2006 |
| WO | 2006069443 A1 | 7/2006 |
| WO | 2006078839 A2 | 7/2006 |
| WO | 2006105579 A1 | 10/2006 |
| WO | 2006116231 A1 | 11/2006 |
| WO | 2006120646 A1 | 11/2006 |
| WO | 2007007052 A2 | 1/2007 |
| WO | 2008000078 A1 | 1/2008 |
| WO | 2008078096 A2 | 7/2008 |
| WO | 2008078099 A1 | 7/2008 |
| WO | 2008099174 A1 | 8/2008 |
| WO | 2008125869 A1 | 10/2008 |
| WO | 2008129233 A1 | 10/2008 |
| WO | 2008147280 A1 | 12/2008 |
| WO | 2009046181 A1 | 4/2009 |

OTHER PUBLICATIONS

Hornby, Brian E., "Imaging of Near-Borehole Structure with the Array Sonic Tool", Aug. 12, 2001.*

Parra, Jorge O. et al., "Wave Attenuation Attributes as Flow Unit Indicators", Jun. 2002, The Leading Edge.*

Gonzales, R.J. et al., Development and Application of an Integrated Clustering/Geostatistical Approach for 3D Reservoir Characterization, SACROC Unit, Permian Basin, Oct. 28-31, 2007, 2007 SPE/EAGE Reservoir Characterization and Simulation Conference.*

Montaron, Bernard, "A Quantitative Model for the Effect of Wettability on the Conductivity of Porous Rocks", Mar. 11-14, 2007, 15th SPE Middle East Oil & Gas Show and Conference, Society of Petroleum Engineers.*

Landa, Jorge L., "Sensitivity Analysis of Petrophysical Properties Spatial Distributions, and Flow Performance Forecasts to Geostatistical Parameters Using Derivative Coefficients", Sep. 29-Oct. 2, 2002, SPE Annual Technical Conference and Exhibition, Society of Petroleum Engineers.*

Liu, Xiaohuan et al., "Merging Outcrop Data and Geomechanical Information in Stochastic Models of Fractured Reservoirs", Nov. 8-9, 2004, SPE International Petroleum Conference, Society of Petroleum Engineer, Inc.*

Hurley et al., "Flow Unit Determination in a Vuggy Dolomite Reservoir, Dagger Draw Field, New Mexico", May 30-Jun. 3, 1999, SPWLA 40th Annual Logging Symposium.*

Zhang, T. et al., "3D Porosity Modeling of a Carbonate Reservoir Using Continuous Multiple-Point Statistics Simulation", Sep. 2006, SPE Journal, Society of Petroleum Engineers.*

Strebelle, Sebastien et al., "Modeling of a Deepwater Turbidite Reservoir Conditional to Seismic Data Using Multiple-Point

(56) References Cited

OTHER PUBLICATIONS

Geostatistics", Sep. 29-Oct. 2, 2002, SPE Annual Technical Conference and Exhibition, Society of Petroleum Engineers.*
Knackstedt et al., "Digital Core Laboratory: Properties of Reservoir Core Derived from 3D Images", 2004, Asia Pacific Conference on Integrated Modeling for Asset Management, Society of Petroleum Engineers, Inc.*
Zhang, et al, "Models and methods for determining transport properties of touching-vug carbonates" SPE 96027, presented at the SPE Annual Technical Conference and Exhibition, Dallas, TX, Oct. 9-12, 2005, 9 pages.
Zhang, et al, "3D porosity modeling of a carbonate reservoir using continuous multiple-point statistics simulation" SPE 96308. Journal vol. 11, Sep. 2006, pp. 375-379.
Zhang, T. 2006a, "Filter-based training image pattern classification for spatial pattern simulation" PhD dissertation, Stanford University, Palo Alto, CA, Mar. 2006, 153 pages.
Zhang, et al, 2006, "Filter-based classification of training image patterns for spatial pattern simulation" Mathematical Geology, vol. 38, No. 1, pp. 63-80.
Zhang, T. "Incorporating geological conceptual models and interpretations into reservoir modeling using multi-point geostatistics" Earth Science Frontiers, vol. 15, No. 1, Jan. 2008, pp. 26-35.
Zhang, et al, "Numerical modeling of heterogeneous carbonates and multi-scale dynamics" Presented at the SPWLA 50th Annual Logging Symposium, The Woodlands, Texas, Jun. 21-24, 2009, 12 pages.
Zuiderveld, K, "Contrast limited adaptive histograph equalization" in Heckbert, P. S., Graphic Gems IV, San Diego: Academic Press Professional, 1994, pp. 474-485.
Zhang, "Multiple-point simulation of multiple reservoir facies" Unpublished M.S. thesis, Stanford University, California, May 2002, 163 pages.
Holt, "Particle vs. laboratory modeling in in situ compaction" Physics and Chemistry of the Earth, Part A: Solid Earth and Geodesy, vol. 26, Issue 1-2, 2001, pp. 89-93.
Hoshen, et al, "Percolation and cluster distribution—I. Cluster multiple labeling technique and critical concentration algorithm" Physical Review B, vol. 14, No. 8, Oct. 15, 1976, pp. 3438-3445.
Huang, et al, "Super-resolution fluorescence microscopy" Annual Review of Biochemistry, vol. 78, 2009, pp. 993-1016.
Hurley, et al, "Quantification of vuggy porosity in a dolomite reservoir from borehole images and core, Dagger Draw Field, New Mexico" SPE 49323, presented at the SPE Annual Technical Conference and Exhibition, New Orleans, Louisiana, Sep. 27-30, 1998, 14 pages.
Hurley, "Flow unit determination in a vuggy dolomite reservoir, Dagger Draw Field, New Mexico" SPWLA Transactions, presented at the SPWLA 40th Annual Logging Symposium, Oslo, Norway, May 30-Jun. 3, 1999, 14 pages.
Hurley, "Borehole Images" in Asquith, G. and Krygowski, D.: Basic Well Log Analysis, 2nd Edition, AAPG Methods in Exploration Series No. 16, 2004, pp. 151-164.
Hurley, et al, "Method to generate fullbore images using borehole images and multi-point statistics" SPE 120671-PP, presented at the Middle East Oil & Gas Show and Conference, Bahrain, Mar. 15-18, 2009, 18 pages.
Jackson, et al, "Upscaling permeability measurements within complex heterolithic tidal sandstones" Mathematical Geology, vol. 35, No. 5, Jul. 2003, pp. 499-520.
Jackson, et al, "Three-dimensional reservoir characterization and flow simulation of heterolithic tidal sandstones" AAPG Bulletin, vol. 89, No. 4, Apr. 2005, pp. 507-528.
Jennings, "Capillary pressure techniques: Application to exploration and development geology" AAPG Bulletin, vol. 71, No. 10, Oct. 1987, pp. 1196-1209.
Kayser, et al, "Visualizing internal rock structures" Offshore, vol. 64, No. 8, Aug. 2004, pp. 129-131.
Kayser, et al, "A closer look at pore geometry" Oilfield Review, vol. 18, No. 1, 2006, pp. 4-13.
Knackstedt, et al, "Digital core laboratory: Properties of reservoir core derived from 3d images" SPE 87009, Presented at the Asia-Pacific Conference on Integrated Modelling for Asset Management, Mar. 29-30, 2004, 14 pages.
Pittman, "Relationship of porosity and permeability to various parameters derived from mercury injection-capillary pressure curves for sandstone" AAPG Bulletin, vol. 76, No. 2, Feb. 1992, pp. 191-198.
Kuglin, et al, 1975, "The phase correlation image alignment method" Proceedings of the IEEE, International Conference on Cybernetics and Society, Palo Alto, CA, 1975, pp. 163-165.
Kuwahara, et al, 1976, "Digital processing of biomedical images" Plenum Press, 1976, pp. 187-203.
Kyprianidis, et al, "Image and video abstraction by anisotropic kuwahara filtering" Pacific Graphics, vol. 28, No. 7, 2009, pp. 1955-1963.
Lasseter, et al, "Reservoir heterogeneities and their influence on ultimate recovery" in Lake, L. W., and Carroll, H. B., Jr., eds., Reservoir Characterization: Academic Press, Orlando, Florida, 1986, pp. 545-559.
Leduc, et al, "FMI* based sedimentary facies modelling, Surmont Lease (Athabasca, Canada)" (abs.): CSPG Annual Convention, Calgary, Alberta, Canada, Jun. 3-7, 2002, 10 pages.
Levy, et al, "Geomorphology of carbonate systems and reservoir modeling: Carbonate training images, FDM cubes, and MPS simulations" (abs.):AAPGAnnual Convention, Long Beach, California, Apr. 1-4, 2007a, http://searchanddiscovery.com/ documents /2008/ 08054levy/index.htm (accessed Jul. 15, 2008) 6 pages.
Levy, et al, "Importance of facies-based earth models for understanding flow behavior in carbonate reservoirs" (abs.): AAPG Annual Convention, Long Beach, California, Apr. 1-4, 2007b, http://searchanddiscovery.com/documents/2008 /08097harris25a/index. htm (accessed Sep. 5, 2008) 25 pages.
Li et al, "Investigation of the asphaltene precipitation process from Cold Lake bitumen by confocal scanning laser microscopy" SPE 30321, Presented at the International Heavy Oil Symposium, Calgary, Alberta, Canada, Jun. 19-21, 1995, pp. 709-716.
Li, "Characterization of rock heterogeneity using fractal geometry" SPE 86975, Presented at SPE International Thermal Operations and Heavy Oil Symposium and Western Regional Meeting, Mar. 16-18, 2004, Bakersfield, California, 7 pages.
Mandelbrot, "How long is the coast of Britain? Statistical self-similarity and fractional dimension" Science, vol. 156, 1967, pp. 636-638.
Marrett et al, "Extent of power law scaling for natural fractures in rocks" Geology, vol. 27, No. 9, Sep. 1999, pp. 799-802.
Marzouk et al "Geologic controls on wettability of carbonate reservoirs, Abu Dhabi, U.A.E." SPE 29883, presented at the SPE Middle East Oil Show, Kingdom of Bahrain, Mar. 11-14, 1995, pp. 449-450.
Mathis, et al, "From the geologists' eyes to synthetic core descriptions: Geological log modeling using well-log data (abs.)" AAPG Annual Meeting, Salt Lake City, UT, May 2003, 7 pages.
Mell, B. Analytical report Nanovea—061213-21: Microphotonics internal report, Dec. 13, 2006, 10 pages.
Menendez, et al, "Confocal scanning laser microscopy applied to the study of pore and crack networks in rocks" Computers & Geoscience, vol. 27, No. 9, 2001, pp. 1101-1109.
Microphotonics, 2009, http://www.nanovea.com/Profilometers, html, accessed Mar. 30, 2 pages.
Neal, et al, "Sequence stratigraphy—A global theory for local success" Oilfield Review, January issue, 1993, pp. 51-62.
Nix, et al, "New methods applied to the microstructure analysis of Messel Oil Shale: Confocal laser scanning microscopy (CLSM) and environmental scanning electron microscopy (ESEM)" Geology Magazine, vol. 140, No. 4, 2003, pp. 469-478.
Norris, et al, "The geological modeling of effective permeability in complex heterolithic facies" SPE 22692, Presented at the 66th Annual Technical Conference and Exhibition, Dallas, TX, Oct. 6-9, 1991, pp. 359-374.
O'Connor, et al, "Microscale flow modeling in geologic materials" Physics and Chemistry of the Earth, Part A: Solid Earth and Geodesy, vol. 24, Issue 7, 1999, 9 pages.

(56) References Cited

OTHER PUBLICATIONS

Okabe, et al, "Prediction of permeability for porous media reconstructed using multiple-point statistics" Physical Review E, vol. 70, 2004, pp. 066135-1-066135-10.
Okabe, et al, "Pore space reconstruction using multiple-point statistics" Journal of Petroleum Science and Engineering, vol. 46, 2005, pp. 121-137.
Okabe, et al, "Pore space reconstruction of vuggy carbonates using microtomography and multiple-point statistics" Water Resources Research, vol. 43, 2007, W12S02, 5 pages.
Okabe, et al, "Pore-scale heterogeneity assessed by the lattice-Boltzmann method" International Symposium of the Soc. of Core Analysts, Trondheim, Norway, Sep. 12-16, 2006 Paper SCA2006-44, 7 pages.
Oren, et al, "Process based reconstruction of sandstones and prediction of transport properties" Transport in Porous Media, vol. 46, 2002, pp. 311-343.
Papari, et al, "Artistic edge and corner enhancing smoothing" IEEE Transactions on Image Processing, vol. 16, No. 10, Oct. 2007, pp. 2449-2462.
Petford, et al, 2001, "Investigation of the petrophysical properties of a porous sandstone using confocal scanning laser microscopy" Petroleum Geoscience, vol. 7, No. 2, 2001, pp. 99-105.
Pittman, et al, "Use of pore casts and scanning electron microscope to study pore geometry" Journal of Sedementary Petrology, vol. 40, No. 4, Dec. 1970, pp. 1153-1157.
Pittman, "Microporosity in carbonate rocks" AAPG Bulletin, vol. 55, No. 10, Oct. 1971, pp. 1873-1881.
Zhang et al., "Porous Media Reconstruction Using a Cross-Section Image and Multiple-point Geostatistics," International Conference on Advanced Computer Control, 2009: pp. 24-29.
International Preliminary Report on Patentability of PCT Application No. PCT/US2010/040378 dated Apr. 5, 2012: pp. 1-5.
International Search Report of PCT Application No. PCT/EP2008/061364 dated Dec. 5, 2008: pp. 1-3.
International Search Report of PCT Application No. PCT/US2009/040198 dated Nov. 19, 2009: pp. 1-3.
International Search Report of PCT Application No. PCT/US2010/040363 dated Apr. 5, 2011: pp. 1-3.
International Search Report of PCT Application No. PCT/US2010/040378 dated Apr. 5, 2011: pp. 1-3.
Adams, et al, "Strategies for dipmeter interpretation" Part 2: The Technical Review, vol. 35, No. 4, 1987, pp. 20-31.
Angulo, et al, "Fractal dimensions from mercury intrusion capillary tests" SPE 23695, Presented at the Second Latin American Petroleum Engineering Conference, Caracas, Venezuela, Mar. 8-11, 1992, pp. 255-263.
Anselmetti, et al, "Quantitative characterization of carbonate pore systems by digital image analysis" AAPG Bulletin, vol. 82, No. 10, Oct. 1998, pp. 1815-1836.
Bakke, et al, "3-D pore-scale modeling of sandstones and flow simulations in the pore networks" SPE 35479, vol. 2, European 3-D Reservoir Modeling Conference, held in Stavanger, Norway, Apr. 16-17, 1996, Jun. 1997, pp. 136-149.
Bakke, et al, "Pore scale modeling of carbonate reservoir rocks" Downloaded from website http://www.numericalrocks.com, Mar. 30, 2008, 13 pages.
Bear, J., "Dynamics of fluids in porous media" Elsevier, New York, 1972: pp. 13-26 and 38-57, 1972.
Behseresht, et al, "Infinite-acting physically representative networks for capillarity-controlled displacements" SPE 110581, presented at the SPE Annual Technical Conference and Exhibition, Anaheim, CA, Nov. 11-14, 2007, 15 pages.
Bereskin, et al, "Carbonate microporosity: Recognizing its existence and understanding its role in hydrocarbon production", in Dolly, E. D., and Mullarkey, J. C., eds., Hydrocarbon Production from Low Contrast, Low Resistivity Reservoirs, Rocky Mountain and Midcontinent Regions: Log Examples of Subtle Pays: Rocky Mountain Association of Geologists Guidebook, Denver, Colorado, 1996, pp. 33-42.

Bigelow, "Making more intelligent use of log derived dip information. Part 1, Suggested guidelines" The Log Analyst, vol. 26, No. 1, pp. 41-53, 1985.
Bigelow "Making more intelligent use of log derived dip information. Part 2, Wellsite data gathering considerations" The Log Analyst, vol. 26, No. 2, pp. 25-41, 1985.
Bigelow, "Making more intelligent use of log derived dip information. Part 3, Computer processing considerations" The Log Analyst, vol. 26, No. 3, pp. 18-31, 1985.
Bigelow, "Making more intelligent use of log derived dip information. Part 4, Structural interpretation" The Log Analyst, vol. 26, No. 4, pp. 21-43, 1985.
Bigelow, "Making more intelligent use of log derived dip information. Part 5, Stratigraphic interpretation" The Log Analyst, vol. 26, No. 5, pp. 25-64, 1985.
Bosl, et al, "A study of porosity and permeability using a lattice Boltzmann simulation" Geophysical Research Letters, vol. 25, No. 9, May 1998, pp. 1475-1478.
Bourke, "Core permeability imaging: It's relevance to conventional core characterization and potential application to wireline measurement" Marine and Petroleum Geology, vol. 10, Aug. 1993, pp. 318-324.
Bryant, et al, "Physically representative network models of transport in porous media" American Institute of Chemical Engineers Journal, vol. 39, No. 3, Mar. 1993, pp. 387-396.
Caers, et al, "Multiple-point geostatistics: A quantitative vehicle for integration of geologic analogs into multiple reservoir models", in M. Grammer, P. M. Harris and G. P. Eberli, eds.: Integration of Outcrop and Modern Analogs in Reservoir Modeling, AAPG. Memoir 80, 2004, pp. 383-394.
Cantrell, et al, "Microporosity in Arab Formation carbonates, Saudi Arabia" GeoArabia, vol. 4, No. 2, 1999, pp. 129-154.
Chen, et al, "What is the shape of pores in natural rocks?" Journal of Chemical Physics, vol. 116, May 2002, pp. 8247-8250.
Choquette, et al, "Geologic nomenclature and classification of porosity in sedimentary carbonates" AAPG Bulletin, vol. 54, No. 2, Feb. 1970, pp. 207 250.
Christie, M. A, Upscaling for reservoir simulation: JPT, SPE 37324, vol. 48, No. 11, Nov. 1996, pp. 1004-1010.
Clauset, et al, "Power-law distributions in empirical data" SIAM Review, vol. 51, No. 4, Feb. 2009, pp. 1-43.
Clerke, "Permeability, relative permeability, microscopic displacement efficiency, and pore geometry of M_1 bimodal pore systems in Arab D limestone" SPE Journal, vol. 14, No. 3, 2009, 8 pages.
Clerke, et al, "Application of Thomeer hyperbolas to decode the pore systems, facies and reservoir properties of the upper Jurassic Arab D limestone, Ghawar field, Saudi Arabia: A "Rosetta Stone" approach" GeoArabia, vol. 13, No. 4, 2008, pp. 113-116.
Coles, et al, "Developments in synchrotron X-ray microtomography with applications to flow in porous media" SPE 36531, presented at the SPE Annual Technical Conference and Exhibition, Denver, CO, Oct. 6-9, 1996, pp. 413-424.
Creusen, et al, "Property modeling small scale heterogeneity of carbonate facies" SPE 111451, Presented at Reservoir Characterization and Simulation Conference, Abu Dhabi, U.A.E., Oct. 28-31, 2007, 5 pages.
Davis, et al, "Image analysis of reservoir pore systems: State of the art in solving problems related to reservoir quality" SPE 19407, presented at the SPE Formation Damage Control Symposium, Lafayette, Louisiana, Feb. 22-23, 1990, pp. 73-82.
Dehghani, et al, "Modeling a vuggy carbonate reservoir, McElroy Field, West Texas" AAPG Bulletin, vol. 83, No. 1, Jan. 1999, pp. 19-42.
Delhomme, "A quantitative characterization of formation heterogeneities based on borehole image analysis" Trans. 33rd Symposium SPWLA, Paper T, Jun. 1992, 25 pages.
Duey, R, "Quick analysis answers Heidrun question" Hart Energy Publishing, LP, accessed online at http://www.eandp.info/index2.php?area=article&articleId=767, Mar. 27, 2008, 4 pages.
Durlofsky, "Upscaling of geocellular models for reservoir flow simulation: A review of recent progress" presented at the 7th International Forum on Reservoir Simulation, Buhl/Baden-Baden, Germany, Jun. 23-27, 2003, 58 pages.

(56) References Cited

OTHER PUBLICATIONS

Dvorkin, et al, "Real time monitoring of permeability, elastic moduli and strength in sands and shales using Digital Rock Physics" SPE 82246, presented at the SPE European Formation Damage Conference, The Hague, Netherlands, May 13-14, 2003, 7 pages.

Ehrlich, et al, "Petrographic image analysis, I. Analysis of reservoir pore complexes" Journal of Sedimentary Petrology, vol. 54, No. 4, Dec. 1984, pp. 1365-1378.

Fabbri, "GIAPP: Geological image-analysis program package for estimating geometrical probabilities" Computers & Geosciences, vol. 6, No. 2. 1980, pp. 153-161.

Fredrich, et al, "Imaging the pore structure of geomaterials" Science, vol. 268, Apr. 1995, pp. 276-279.

Fredrich, "3D imaging of porous media using laser scanning confocal microscopy with application to microscale transport processes" Physics and Chemistry of the Earth, Part A: Solid Earth and Geodesy, vol. 24, No. 7, 1999, pp. 551-561.

Fredrich, et al, "Predicting macroscopic transport properties using microscopic image data" Journal of Geophysical Research, vol. 111, 2006, 14 pages.

Fredrich, et al, "Predicting petrophysical properties using 3D image data (abs.)" AAPG Annual Convention, downloaded at http://www.aapg.org, 2007.

Gies, et al, "Petrographic image analysis: An effective technology for delineating reservoir quality" SPE 26147, presented at the SPE Gas Technology Symposium, Calgary, Alberta, Canada, Jun. 28-30, 1993, pp. 99-106.

Gilreath, Strategies for dipmeter interpretation: Part I: The Technical Review, vol. 35, No. 3, 1987, pp. 28-41.

Gomaa, et al, "Case study of permeability, vug quantification, and rock typing in a complex carbonate" SPE 102888, presented at 81st Annual Technical Conference and Exhibition in San Antonio, Texas on Sep. 24-27, 2006, 11 pages.

Grace, et al, "Geological applications of dipmeter and Borehole electrical images" Short Course Notes, Schlumberger Oilfield Services, vol. 8.1, 1998, 32 pages.

Greder, et al, "Determination of permeability distribution at log scale in vuggy carbonates" Paper BB, SPWLA 37th Annual Logging Symposium, Jun. 16-19, 1996, 14 pages.

Guardiano, et al, "Multivariate geostatistics: Beyond bivariate moments" Geostatistics—Troia, A. Soares. Dordrecht, Netherlands, Kluwer Academic Publications, vol. 1, 1993, pp. 133-144.

Harris, "Delineating and quantifying depositional facies patterns in carbonate reservoirs: Insight from modern analogs" AAPG Bulletin, vol. 94, No. 1, Jan. 2010, pp. 61-86.

Hartmann, et al, 1999, "Predicting Reservoir System Quality and Performance" in Beaumont E. A. and N.H. Foster, eds., AAPG Treatise of Petroleum Geology/Handbook of Petroleum Geology: Exploring for Oil and Gas Traps, Chapter 9, 1999, pp. 9-1 to 9-154.

Hassall, et al, "Comparison of permeability predictors from NMR, formation image and other logs in a carbonate reservoir" SPE 88683, presented at the Abu Dhabi International Petroleum Exhibition and Conference, Abu Dhabi, U. A.E., Oct. 10-13, 2004, 13 pages.

Höcker, et al, "Use of dipmeter data in clastic sedimentological studies" AAPG Bulletin, vol. 74, No. 2, Feb. 1990, pp. 105-118.

Pizer, et al, "Adaptive histogram equalization and its variations" Computer Vision, Graphics and Image Processing, vol. 39, No. 3, 1987, pp. 355-368.

Preibisch, et al, "Globally optimal stitching of tiled 3D microscopic image acquisitions" Bioinformatics Advance Access, vol. 25, No. 11, Apr. 2009, 3 pages.

Prodanovic, et al, "Porous structure and fluid partiioning in polyethylene cores from 3D X-ray microtomographic imaging" Journal of Colloid and Interface Science, vol. 298, 2006, pp. 282-297.

Pyrcz, et al, "The whole story on the hole effect", in Searston, S. (ed.) Geostatistical Association of Australasia, Newsletter 18, May 2003, 16 pages.

Qi, D., Upscaling theory and application techniques for reservoir simulation: Lambert Academic Publishing, Saarbrucken, Germany, 2009, 7 pages.

Ramakrishnan, et al, "A petrophysical and petrographic study of carbonate cores from the Thamama formation" SPE 49502, presented at the 8th Abu Dhabi International Petroleum Exhibition and Conference, Abu Dhabi, U.A.E., Oct. 11-14, 1998, 14 pages.

Ramamoorthy, et al, "A new workflow for petrophysical and textural evaluation of carbonate reservoirs" Paper B presented at the SPWLA 49th Annual Logging Symposium, Edinburgh, Scotland, May 25-28, 2008, 15 pages.

Zhang, et al, "Pore scale study of flow in porous media: Scale dependency, REV, and statistical REV" Geophysical Research Letters, vol. 27, No. 8, Apr. 2000, pp. 1195-1198.

Reid, et al, "Monterey Formation porcelanite reservoirs of the Elk Hills field, Kern County, California" AAPG Bulletin, vol. 85, No. 1, Jan. 2001, pp. 169-189.

Ribes, et al, "Applications of confocal macroscope-microscope luminescence imaging to sediment cores" New Techniques in Sediment Core Analysis: Geological Society of London, Special Publication vol. 267, 2006, pp. 141-150.

Roerdink, et al, "The watershed transform: Definitions, algorithms and parallelization strategies" Fundamenta Informaticae, vol. 41, 2001, pp. 187-228.

Russell, et al, "Rock types and permeability prediction from dipmeter and image logs: Shuaiba reservoir (Aptian), Abu Dhabi" AAPG Bulletin, vol. 86, No. 10, Oct. 2002, pp. 1709-1732.

Sahoo, et al, "A survey of thresholding techniques" Computer Vision, Graphics, and Image Processing, vol. 41, No. 2, 1988, pp. 233-260.

Saltykov, "The determination of the size distribution of particles in an opaque material from a measurement of size distribution of their sections" in Elias, H (ed) Stereology: Proc. Second Int. Cong. For Stereology, New York: Springer-Verlag, 1967, pp. 163-173.

Zemanek, et al, "Formation evaluation by inspection with the borehole televiewer" Geophysics, vol. 35, No. 2, Apr. 1970, pp. 254-269.

Schlumberger, "Stratigraphic high resolution dipmeter tool" Schlumberger Ltd., Paris, Document No. M-08630, 1983, 26 pages.

Sezgin, et al, "Survey over image thresholding techniques and quantitative performance evaluation" Journal of Electronic Imaging, vol. 13, No. 1, Jan. 2004, pp. 146-165.

Siddiqui, et al, "Data visualization challenges for displaying laboratory core and flow data in three-dimensions" SPE 106334, presented at the SPE Technical Symposium of Saudi Arabia, May 14-16, 2005, 9 pages.

Siddiqui, et al, "Techniques for extracting reliable density and porosity data from cuttings" SPE 96918, presented at the SPE Annual Technical Conference and Exhibition, Dallas, TX, Oct. 9-12, 2005, 13 pages.

Solymar, et al, "Image analysis and estimation of porosity and permeability of Arnager Greensand, Upper Cretaceous, Denmark" Physics and Chemistry of the Earth, Part A: Solid Earth and Geodesy, vol. 24, No. 7, 1999, pp. 587-591.

Strebelle, "Conditional simulation of complex geological structures using multiple point statistics" Mathematical Geology, vol. 34, No. 1, Jan. 2002, pp. 1-21.

Strebelle, et al, "Modeling of a deepwater turbidite reservoir conditional to seismic data using principal component analysis and multiple-point geostatistics" SPE Journal, Sep. 2003, pp. 227-235.

Strebelle, et al, "Non-stationary multiple-point geostatistical models", in Leuangthong, O. and Deutsch, C. V., eds.: Geostatistics, vol. 1, 2004, pp. 235-244.

Suicmez, et al, "Pore network modeling: A new technology for SCAL predictions and interpretations" Saudi Arabia Oil and Gas, Issue 5, 2008, pp. 64-70.

Yuan, et al, "Resolving pore-space characteristics by rate-controlled porosimetry" SPE Formation Evaluation, vol. 4, No. 1, Mar. 1989, pp. 17-24.

Taud, et al, "Porosity estimation method by x-ray computed tomography" Journal of Petroleum Science and Engineering, vol. 47, No. 3-4, 2005, pp. 209-217.

Thomeer, "Introduction of a pore geometrical factor defined by the capillary pressure curve" Journal of Petroleum Technology, vol. 12, No. 3, Mar. 1960, pp. 73-77.

Thompson, "Fractals in rock physics" Annual Review of Earth and Planetary Sciences, vol. 19, 1991, pp. 237-262.

(56) References Cited

OTHER PUBLICATIONS

Tilke, et al, "Quantitative analysis of porosity heterogeneity: Application of geostatistics to borehole images" Mathematical Geology, vol. 38, No. 2, Feb. 2006, pp. 155-174.

Tomutsa, et al, "Focused ion beam assisted three-dimensional rock imaging at submicron scale" International Symposium of the Soc. of Core Analysts, Pau, France, Sep. 21-24, 2003, Paper SCA2003-47, 6 pages.

Tomutsa, et al, "Analysis of chalk petrophysical properties by means of submicron-scale pore imaging and modeling" SPE Reservoir Evaluation and Engineering, vol. 10, Jun. 2007, pp. 285-293.

Vahrenkamp, et al, Multi-scale heterogeneity modelling in a giant carbonate field, northern Oman (abs.): GeoArabia, 2008, vol. 13, No. 1, p. 248.

Vincent, "Watersheds in digital spaces: An efficient algorithm based on immersion simulations" IEEE Transactions on Pattern Analysis and Machine Intelligence, vol. 13, No. 6, Jun. 1991, pp. 583-598.

Vinegar, "X-ray CT and NMR imaging of rocks" JPT, Mar. 1986, pp. 257-259.

Wardlaw, "Pore geometry of carbonate rocks as revealed by pore casts and capillary pressure" AAPG Bulletin, vol. 60, No. 2, Feb. 1976, pp. 245-257.

Washburn, "The dynamics of capillary flow" Physical Review, vol. 17, No. 3, Mar. 1921, pp. 273-283.

Wellington, et al, "X-ray computerized tomography" JPT, Aug. 1987, pp. 885-898.

Williams, et al, "Assessment and interpretation of electrical borehole images using numerical simulations" The Log Analyst, vol. 38, No. 6, Nov.-Dec. 1997, pp. 34-44.

Withjack, et al, "The role of X-ray computed tomography in core analysis" SPE 83467, presented at the Western Region/AAPG Pacific Section Joint Meeting, Long Beach, CA, May 19-24, 2003, 12 pages.

Wu, et al, "3D stochastic modeling of heterogeneous porous media—Applications to reservoir rocks" Transport in Porous Media, vol. 65, 2006, pp. 443-467.

Wu, et al, "Validation of methods for multi-scale pore space reconstruction and their use in prediction of flow properties of carbonate" Paper SCA2008-34, International Symposium of the Society of Core Analysts, Abu Dhabi, Oct. 29-Nov. 2, 2008, 12 pages.

Xiao, et al, "Fully integrated solution for LWD resistivity image application a case study from Beibu Gulf, China" 1st SPWLA India Regional Conference, Formation Evaluation in Horizontal Wells, Mumbai, Mar. 19-20, 2007, 10 pages.

Ye, et al, "Automatic high resolution texture analysis on borehole imagery" Transactions of the SPWLA Annual Logging Symposium, May 1998, pp. M1-M14.

Akbar et al., "A Snapshot of Carbonate Reservoir Evaluation," Oilfield Review, Winter 2000/2001: pp. 20-41.

Cha et al., "Nontranslational three-dimensional profilometry by chromatic confocal microscopy with dynamically configurable micromirror scanning," Applied Optics, Jun. 2000, vol. 39(16): pp. 2605-2613.

Coates et al., "NMR Logging Principles and Applications," Halliburton Energy Services: Houston, 1999: pp. 1-253.

Creath, "Surface Profilometry: State of the Art," 1992: pp. 2.1-2.20, <http://www.tesisenred.net/bitstream/handle/10803/6745/03CHAPTER2.pdf?sequence=3>.

Eaton, "On the importance of geological heterogeneity for flow simulation," Sedimentary Geology, 2006, vol. 184: pp. 187-201.

"Summary of FY 2008 Geosciences Research," U.S. Department of Energy, Nov. 2008: pp. 1-260.

Gunter et al., "SPE 38679: Early Determination of Reservoir Flow Unites Using an Integrated Petrophysical Method," SPE International, 1997: pp. 1-8.

Hurley et al., "Flow Unit Determination in a Vuggy Dolomite Reservoir, Dagger Draw Field, New Mexico," SPWLA 40th Annual Logging Symposium, May/Jun. 1999: pp. 1-14.

Inoué, "Foundations of Confocal Scanned Imaging in Light Microscopy," Handbook of Biological Confocal Microscopy, Third Edition, SpringerScience + Business Media: New York, 2006: pp. 1-19.

International Preliminary Report on Patentability of PCT Application No. PCT/US2010/040378 dated Jan. 4, 2012: pp. 1-5.

Kim et al., "Three-Dimensional Tissue Cytometer Based on High-Speed Multiphoton Microscopy," Cytometry Part A, 2007, vol. 71A: pp. 991-1002.

Knackstedt et al., "SCA2006-23: 3D Imaging and Flow Characterization of the Pore Space of Carbonate Core Samples," International Symposium of the Society of Core Analysts, Sep. 2006: pp. 1-13.

Øren et al., "Extending Predictive Capabilities to Network Models," SPE Journal, Dec. 1998: pp. 324-336.

Phillips et al., "Measuring physical density with X-ray computed tomography," NDT&E International, 1997, vol. 30 (6): pp. 339-350.

Royo Royo, "Chapter 2: Surface profilometry: state of the art," Topographic measurements of non-rotationally symmetrical concave surfaces using Ronchi deflectometry, Polytechnic University of Catalonia, Barcelonatech, Jul. 1999: pp. 2.1-2.20, <http://hdl.handle.net/10803/6745>.

Warlaw, "SPE 8843: The Effects of Pore Structure o Displacement Efficiency in Reservoir Rocks and in Glass Micromodels," SPE/DOE Symposium on Enhanced Oil Recovery, Apr. 1980: pp. 345-352.

Wei et al., "Confocal white light profilometry as a tool for surface studies of paintings," Retrieved Jun. 12, 2009: pp. 1-2.

Wu et al., "SCA2007-16: Reconstruction of Multi-scale Heterogeneous Porous Media and Their Flow Prediction," International Symposium of the Society of Core Analysts, Sep. 2007: pp. 1-12.

Zeiss, "LSM 700," Carl Zeiss MicroImaging GmbH, Dec. 2008: pp. 1.34.

Gilreath, "Strategies for Dipmeter Interpretation," Technical Review, Jul. 1987, vol. 35(3): pp. 28-41.

Saltikov, "The Determination of the Size Distribution of Particles in an Opaque Material from a Measurement of the Size Distribution of Their Sections," Stereology: Proceedings of the Second International Congress for Stereology, 1967: pp. 163-173.

Salles-Taing, "Seabed Response to Climate Change," Jan. 2009, Sedsim: pp. 1-2, <https://wiki.csiro.au/confluence/display/seabedchange/Home>.

Serra, "Formation MicroScanner Image Interpretation," Schlumberger Educational Services, 1989: pp. 1-70.

Liu et al., "Multiple-Point simulation integrating wells, three-dimensional seismic data, and geology," AAPG Bulletin, Jul. 2004, vol. 88(7): pp. 905-921.

Strebelle, "Sequential Simulation Drawing Structures from Training Images," Stanford University, Thesis for Doctorate of Philosophy, Nov. 2001: pp. 1-200.

* cited by examiner

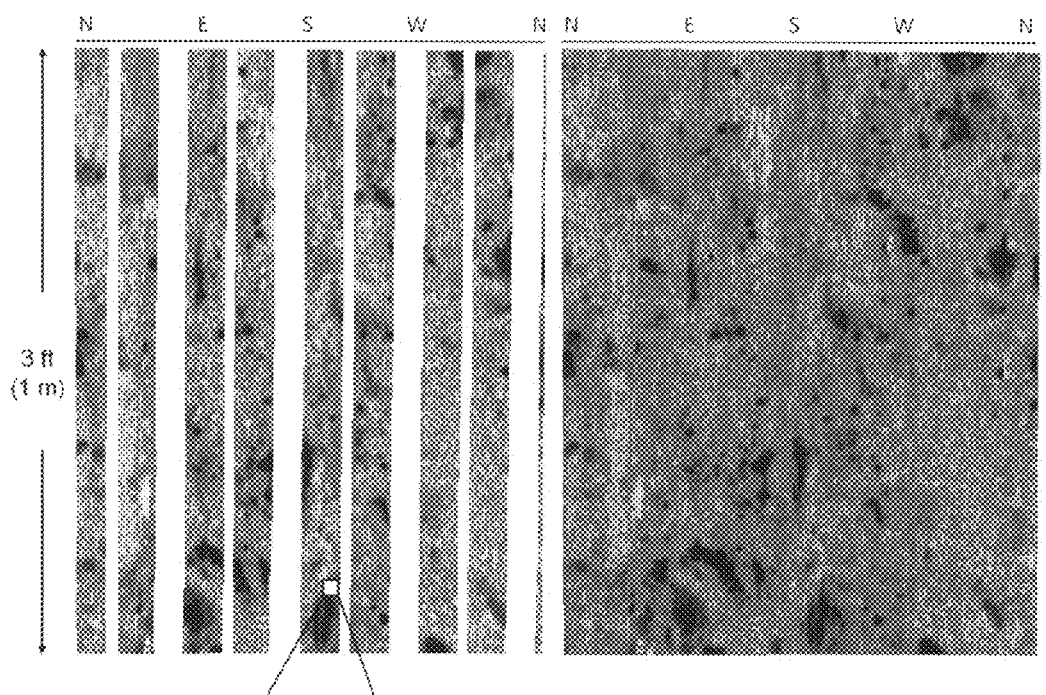
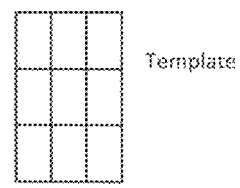
FIGURE 1b
FIGURE 1a

METHOD TO GENERATE NUMERICAL PSEUDOCORES USING BOREHOLE IMAGES, DIGITAL ROCK SAMPLES, AND MULTI-POINT STATISTICS

CROSS-REFERENCE TO RELATED APPLICATIONS

This patent application is related to the following commonly-assigned U.S. Patent Applications which hereby are incorporated by reference in their entirety:
  i) U.S. Provisional Patent Application No. 61/044,018, filed Apr. 10, 2008, and entitled "METHOD FOR CHARACTERIZING A GEOLOGICAL FORMATION TRAVERSED BY A BOREHOLE."
  ii) U.S. Provisional Patent Application No. 61/044,031, filed Apr. 10, 2008, and entitled "METHOD TO GENERATE NUMERICAL PSEUDOCORES USING BOREHOLE IMAGES, DIGITAL ROCK SAMPLES, AND MULTI-POINT STATISTICS."

BACKGROUND OF THE INVENTION

1. Field of the Invention

The invention is generally related to a method using a seminal Multi-point statistics (MPS) algorithm to generate numerical pseudocores from digital rock or core samples and borehole-imaging logs. More particularly, this patent specification relates to creating 3D numerical cores from computed X-ray tomography (CT scans) and formation micro-image (FMI) logs, and performing flow modeling in these numerical cores to understand fluid-flow paths and recovery factors in selected reservoir.

2. Background of the Invention

Electrical and acoustic borehole-imaging tools are widely used to log subsurface boreholes to locate and map the boundaries between rock layers, e.g., bed boundaries, and to visualize and orient fractures and faults. Because electrical logging tools are pad-type devices with fixed arrays of electrodes, it is common to have gaps with missing information between the pads. Electrical and acoustic logs commonly have intervals with poor data quality due to non-functioning electrodes, insufficient pad pressure, borehole irregularities, rock debris, decentralized tools, or poor acoustic reflections.

Digital rock models are constructed from 2D thin sections, scanning-electron-microscope (SEM) images, computer-generated sphere packs, laser-scanning confocalmicroscope-images, and various types of CTscans, e.g., conventional, microCT, and synchrotron-computed microtomography. CTscans are the most widely used approach. CTscans are 2-dimensional (2D) cross sections generated by an X-ray source that rotates around the sample. Density is computed from X-ray attenuation coefficients. Scans of serial cross sections are used to construct 3D images of the sample. Because the density contrast is high between rock and fluid-filled pores, CT images can be used to visualize the rock-pore system. Resolutions are on the sub-millimeter to micron scale, depending on the device being used.

Multi-point statistics (MPS) are used to create simulations of spatial geological and reservoir property fields for subsurface reservoir modeling. These methods are conditional simulations that use known results, such as those measured in wellbores, as fixed or "hard" data that are absolutely honored during the simulations. MPS uses 1D, 2D, or 3D "training images" as quantitative templates to model subsurface property fields. MPS modeling captures geological structures from training images and anchors them to data locations. These structures can be either a priori geological interpretations or conceptual models.

Multipoint geostatistics (MPS) is a new advanced geostatistics approach. It allows reservoir modelers to incorporate their prior knowledge, interpretations, or conceptual models into the reservoir modeling process through training images. These training images are numerical representations of the structures/features that are believed to exist in the reservoir under study. Once we have the training images, MPS can extract curvilinear structures or complex features from the training images and anchor them to the reservoir locations where the samples/observations are collected, leading to more realistic reservoir models. Introducing training images into reservoir modeling is a milestone. Note that there are two ingredients in the use of MPS: training images (conceptual models) and the real data (observations). These two pieces are typically separated. However, in realistic applications, generating representative training images, in particular in 3D, has proved to be a bottleneck in MPS applications. Generating a continuous variable training image is even more difficult than the creation of categorical training image.

There are different types of electrical and acoustic borehole-imaging tools used to log subsurface boreholes to locate and map the boundaries between rock layers, e.g., bed boundaries, and to visualize and orient fractures and faults.

For example, electrical borehole images may run in water-based (conductive) mud, such as Schlumberger's FMI (Formation MicroImager) log, which is based on dipmeter technology that has been commercially available since the 1950's. Electrical borehole-imaging tools are, in essence, sophisticated dipmeters. The imaging tools have microresistivity electrodes arranged around the wellbore on pads that are pressed against the borehole wall. The evolutionary trend from dipmeters to borehole images has been from a few electrodes to a complex array of electrodes on multiple pads. See Hurley, N. F., 2004, Borehole Images, in Asquith, G. and Krygowski, D.: and see Basic Well Log Analysis, $2^{nd}$ Edition, AAPG Methods in Exploration Series No. 16, p. 151-164. Tools are first run into the hole with the pads closed. At the start of the log run, either four, six, or eight pads are pressed against the borehole wall. The number of pads depends on the logging device. Electrical current is forced into the rock through the electrodes, and sensors measure the current after it interacts with the formation. Raw data include multiple electrode readings, caliper readings from individual pads or pairs of pads, and x-, y-, and z-axis accelerometer and magnetometer readings. Borehole deviation and pad 1 (tool) orientation are determined from the magnetometers. The sample rate for electrode and accelerometer data is very high, normally 120 samples/ft (400 samples/m).

Areal coverage of the borehole face is a function of width of the electrode arrays, number of pads, and borehole diameter. In general, 40 to 80% of the borehole face is imaged in typical boreholes. Non-imaged parts of the borehole appear as blank strips between the pads.

Borehole images are created by assigning color maps to different bins or ranges of resistivity values. Colored pixels are then arranged in their proper geometric position around the wellbore. By convention, low-resistivity features, such as shales or fluid-filled fractures, are displayed as dark colors. High-resistivity features, such as sandstones and limestones, are displayed as shades of brown, yellow, and white.

Two main types of processed borehole images are available: static and dynamic. Static images are those which have had one contrast setting applied to the entire well. They provide useful views of relative changes in rock resistivity throughout the borehole. Dynamic images, which have had variable contrast applied in a moving window, provide enhanced views of features such as vugs, fractures, and bed boundaries. Dynamic images bring out subtle features in rocks that have very low resistivities, such as shales, and very high resistivities, such as carbonates and crystalline rocks.

Another example of electrical borehole Images may run in Oil-Based (non-conductive) Mud, in particular high mud resistivities (greater than 50 ohm-m), typical of oil-based muds, are unsuitable for most electrical borehole images. Since 2001, Schlumberger's OBMI (Oil-Base MicroImager), has been available for oil-based muds. This tool generates borehole images by passing electrical current into the formation from two large electrodes on each pad, which is at a high voltage (about 300V). There is a series of closely spaced buttons, located in two rows of 5 on each of the 4 pads. Borehole images are generated from the potential difference (voltage drop) between the closely spaced electrodes. Wide gaps, corresponding to non-imaged parts of the borehole, are common between pads. Another aspect of Borehole images can be acquired during drilling, e.g., logging-while-drilling or hereafter referred to as "LWD". Examples of Schlumberger logs are the GeoVision Resistivity (GVR) and Azimuthal Density Neutron (ADN) tools. The GVR uses rotating electrodes, and works in water-based mud. The ADN generates images from azimuthal density readings, and works in any mud. When the tool rotates during drilling, borehole coverage is complete, with no gaps.

Another aspect of Borehole images can be Acoustic borehole images, also known as borehole televiewers, which are based on technology first developed in the 1960's. Zemanek, J., Glenn, E. E., Norton, L. J., and Caldwell, R. L., 1970, Formation evaluation by inspection with the borehole televiewer: Geophysics, v. 35, p. 254-269.

The Ultrasonic Borehole Imager (UBI) is Schlumberger's primary acoustic tool for open-hole applications. The UBI tool, which is centralized in the well, has a rotating transducer that emits and records sound waves that bounce off of the borehole wall. Both acoustic amplitude and travel time are recorded and processed into images. Normally, borehole coverage is 100%, with no gaps in the images. However, poor-quality images may result when the tool is decentralized, or the borehole wall is irregular.

Petrophysical Facies may be considered, among other things, as characteristic signatures on borehole-image logs, such as vugs, and resistive and conductive patches. A particular view by Dehghani et al. in 1999 suggested that zones of enhanced porosity and permeability exist in the vicinity of vugs. Dehghani, K., Harris, P. M., Edwards, K. A., and Dees, W. T., 1999, Modeling a vuggy carbonate reservoir: AAPG Bulletin, v. 83, p. 19-42.

Dehghani et al. (1999) used thin sections, SEM images, and mini-permeability measurements to confirm their concept. Schindler (2005) and Tanprasat (2005) used image analysis of fluorescent-inked core photos to show that swarms of small vugs preferentially exist in the vicinity of large vugs. See Schindler, J., 2005, Quantification of vuggy porosity, Indian Basin field, New Mexico: Unpublished M.S. thesis, Colorado School of Mines, Golden, Colo.; and Tanprasat, S., 2005, Petrophysical analysis of vuggy porosity in the Shu'aiba Formation of the United Arab Emirates: Unpublished M.S. thesis, Colorado School of Mines, Golden, Colo. Such small vugs are below the resolution of the borehole-imaging tool, so they appear as dark regions, rather than as discrete vugs in the image logs. If this is the general case for vuggy carbonates, electrical and acoustic borehole images should have high-conductivity or low-amplitude (dark) zones or halos in the vicinity of vugs. In fact, this feature is commonly observed, for example, as shown in FIG. 3. High-conductivity zones surrounding vugs and enhanced small-scale porosity, known as conductive patches, form the basis for part of Schlumberger's BorTex software, cited in Russell et al. (2002) and Hassall et al. (2004). See Russell, S. D., Akbar, M., Vissapragada, B., and Walkden, G. M., 2002, Rock types and permeability prediction from dipmeter and image logs: Shuaiba reservoir (Aptian), Abu Dhabi: AAPG Bulletin, v. 86, p. 1709-1732; and see Hassall, J. K., Ferraris, P., Al-Raisi, M., Hurley, N. F., Boyd, A., and Allen, D. F., 2004, Comparison of permeability predictors from NMR, formation image and other logs in a carbonate reservoir: SPE preprint 88683, presented at the 11$^{th}$ Abu Dhabi International Petroleum Exhibition and Conference, Abu Dhabi, U.A.E., 10-13 October.

Delhomme (1992) demonstrated the importance of mapping electrically resistive and non-resistive patches in borehole images. Delhomme, J. P., 1992, A quantitative characterization of formation heterogeneities based on borehole image analysis: Trans. 33$^{rd}$ Symposium SPWLA, Paper T. However, his approach worked poorly because of gaps between the pads. He was unable to draw closed contours around regions of high or low resistivity because of uncertainty about the shapes. Fullbore images (FIG. 4) do allow us to draw closed contours around resistive and/or non-resistive regions in borehole images. Such regions provide important measures of heterogeneity, especially in carbonate reservoirs. These regions are generally much larger than the digital rock or core samples we generate from CTscans of rocks, for example. Because of this, we need borehole images to identify if we want to capture decimeter to meter-scale heterogeneities in our flow models.

Regions with characteristic signatures on borehole-image logs, such as vugs, and resistive and conductive patches are herein termed petrophysical facies. Other authors, such as Leduc et al. (2002) and Mathis et al. (2003) call such textural regions electrofacies. See Leduc, J. P., Delhaye-Prat, V., Zaugg, P., and see Mathis, B., 2002, FMI* based sedimentary facies modelling, Surmont Lease (Athabasca, Canada) (abs.): CSPG Annual Convention, Calgary, Alberta, Canada, 10 p.; and see Mathis, B., Leduc, J. P., and Vandenabeele, T., 2003, From the geologists' eyes to synthetic core descriptions: Geological log modeling using well-log data (abs.): AAPG Annual Meeting, Salt Lake City, Utah, 7 p.

Textures represented by the different colors, for example, black, brown, and white (FIG. 4), could be used to define petrophysical facies. Such facies have complex 3D shapes. Conductive patches, if they are zones of enhanced porosity and permeability, and provide regions of flow continuity between vugs.

The published literature has many examples of numerical rocks built using techniques (or digital rock models of rocks and pores) that include reconstructions made from 2D thin sections or scanning-electron microscope (SEM) images, electrofacies interpreted from logs, computer-generated sphere packs, laser-scanning confocal microscopy, and various types of CTscans (conventional, microCT, and synchrotron-computed microtomography).

Bakke and Oren (1997), Oren et al. (1998), and Oren and Bakke (2002) developed a technique that constructs 3D pore networks from 2D thin sections. Numerical Rocks, (http://www.numericalrocks.com/) computes 3D pore models from 2D thin sections. See Bakke, S., and Oren, P.-E., 1997, 3-D pore-scale modeling of sandstones and flow simulations in the pore networks: SPE preprint 35,479, European 3-D Reservoir Modeling Conference, Stavanger, Norway, April 16-17, p. 136-149; Oren, P.-E., Bakke, S., and Arntzen, O. J., 1998, Extending predictive capabilities to network models: SPE Journal, v. 3, p. 324; and Oren, P.-E., and Bakke, S., 2002, Process based reconstruction of sandstones and prediction of transport properties: Transport in Porous Media, v. 46, p. 311-343. This company also uses pore models built from micro-CTscans. Bakke et al. (2002) successfully applied this technique to sucrosic dolomites. Articles by Duey (2008) and Suicmez and Touati (2008) summarize the results of various sandstone pore networks processed by Numerical Rocks. See Duey, R., 2008, Quick analysis answers Heidrun question: Hart Energy Publishing, LP, accessed online at http://www.e-andp.info/index2.php?area=article&articleId=767, Mar. 27, 2008; and Suicmez, V. S., and Touati, M., 2008, Pore network modeling: A new technology for SCAL predictions and interpretations: Saudi Arabia Oil and Gas, Issue 5, p. 64-70. Wu et al. (2006) presented a method to generate 3D numerical rock models from 2D thin sections using a third-order Markov mesh. See Wu, K., Van Dijke, M. I. J., Couples, G. D., Jiang, Z., Ma, J., Sorbie, K. S., Crawford, J., Young, I., and Zhang, X., 2006, 3D stochastic modelling of heterogeneous porous media—Applications to reservoir rocks: Transport in Porous Media, v. 65, p. 443-467. Awwiller (2007) developed a technique that simulates more complex sandstones than those described by Oren and Bakke (2002). Awwiller's (2007) patent application, US 2007/0203677 A1 (below), relates to this work. Okabe and Blunt (2004, 2005) generated 3D images from 2D thin sections using multi-point statistics. See Okabe, H., and Blunt, M. J., 2004, Prediction of permeability for porous media reconstructed using multiple-point statistics: Physical Review E, v. 70, p. 066135-1-10; and see Okabe, H., and Blunt, M. J., 2005, Pore space reconstruction using multiple-point statistics: Journal of Petroleum Science and Engineering, v. 46, p. 121-137. Tomutsa and Radmilovic (2003) used ion beam thinning to create multiple 2D serial sections that they used to build 3D models of sub-micron-scale pores. See Tomutsa, L., and Radmilovic, V., 2003, Focused ion beam assisted three-dimensional rock imaging at submicron scale: *International Symposium of the Soc. of Core Analysts, Pau, France, September* 21-24, Paper SCA2003-47.

Dvorkin et al. (2003) described Digital Rock Physics technology, which consists of pore-scale numerical simulations derived from: (a) 2D thin sections and statistical indicator simulation, or (b) CTscans. See Dvorkin, J., Kameda, A., Nur, A., Mese, A., and Tutuncu, A. N., 2003, Real time monitoring of permeability, elastic moduli and strength in sands and shales using Digital Rock Physics: SPE preprint 82246, presented at the SPE European Formation Damage Conference, The Hague, Netherlands, May 13-14, 7 p. They built 3D models of virtual rock, and did flow simulations using the lattice-Boltzmann method. U.S. Pat. No. 6,516,080 (below) is related to this work.

Leduc et al. (2002) and Mathis et al. (2003) (both noted above) generated "synthetic cores" from a limited number of described cores, conventional openhole logs, and borehole-image logs. Cluster analysis is used on the conventional openhole logs. "Electrofacies," which are log-based depth intervals of similar lithology, are defined using conventional openhole logs and textural analysis of borehole images. Virtual cores are computed in non-cored wells using "contingency tables." U.S. Pat. No. 6,011,557 (below) is related to this work.

Vahrenkamp et al. (2008) described mini-models, i.e., reservoir models that are less than 1.0 m$^3$ in size and provide pseudo-properties for volume cells in reservoir-scale models. See Vahrenkamp, V. C., Creusen, A., Tull, S., Farmer, A., Mookerjee, A. and Al Bahry, A., 2008, Multi-scale heterogeneity modelling in a giant carbonate field, northern Oman (abs.): GeoArabia, v. 13, No. 1, p. 248. Mini-models are populated using "principle rock types" (PRT), which "cover and categorize the full range of pore types, sizes, pore-throat size distributions, capillary entry pressures, relative permeabilities, etc." PRT's are organized into "rock type associations" (RTA), which are based on "sedimentary fabric" determined from borehole-image logs. RTA's are distributed in the reservoir using borehole-image logs, and observed layering, facies models, and seismic data.

Bryant et al. (1993) and Behseresht et al. (2007) described digital rock models that are computer-generated dense random periodic packings of spheres. See Bryant, S., Mellor, D., and Cade, C., 1993, Physically representative network models of transport in porous media: American Institute of Chemical Engineers Journal, v. 39, No. 3, p. 387-396; and see Behseresht, J., Bryant, S. L., and Sepehrnoori, K., 2007, Infinite-acting physically representative networks for capillarity-controlled displacements: SPE preprint 110581, presented at the SPE Annual Technical Conference and Exhibition, Anaheim, Calif., November 11-14, 15 p. Other workers, such as Bosl et al. (1998) and Holt (2001) have generated similar digital rock models for flow experiments. See Bosl, W. J, Dvorkin, J., and Nur, A., 1998, A study of porosity and permeability using a lattice Boltzmann simulation: Geophysical Research Letters, v. 25, p. 1475-1478; and see Holt, R. M., 2001, Particle vs. laboratory modelling in in situ compaction: Physics and Chemistry of the Earth, Part A: Solid Earth and Geodesy, v. 26, Issue 1-2, p. 89-93.

Fredrich et al. (1995) and Fredrich (1999) created 3D images of rocks using laser scanning confocal microscopy. See Fredrich, J. T., Menendez, B., and Wong, T. F., 1995, Imaging the pore structure of geomaterials: Science, v. 268, p. 276-279; and see Fredrich, J. T., 1999, 3D imaging of porous media using laser scanning confocal microscopy with application to microscale transport processes: Physics and Chemistry of the Earth, Part A: Solid Earth and Geodesy, v. 24, Issue 7, p. 551-561. O'Connor and Fredrich (1999) did flow experiments on these numerical rocks using lattice-Boltzmann methods. See O'Connor, R. M., and Fredrich, J. T., 1999, Microscale flow modeling in geologic materials: Physics and Chemistry of the Earth, Part A: Solid Earth and Geodesy, v. 24, Issue 7, p. 611-616.

The most common way to generate pore networks uses various types of CTscans. Vinegar (1986), Wellington and Vinegar (1987), and Withjack et al. (2003) summarized the technology and discussed various applications of X-ray computed tomography. See Vinegar, H. J., 1986, X-ray CT and NMR imaging of rocks: JPT, p. 257-259; see Wellington, S. L., and Vinegar, H. J., 1987, X-ray computerized tomography: JPT, p. 885-898; and see Withjack, E. M., Devier, C., and Michael, G., 2003, The role of X-ray computed tomography in core analysis: SPE preprint 83467, presented at the Western Region/AAPG Pacific Section Joint Meeting, Long Beach, Calif., May 19-24, 2003, 12 p. Siddiqui and Khamees (2005) and Siddiqui et al. (2005) emphasized the use of 3D images of cores and cuttings from conventional and microCTscans. See Siddiqui, S., and Khamees, A. A., 2005, Data visualization challenges for displaying laboratory core and flow data in three-dimensions: SPE preprint 106334, presented at the SPE Technical Symposium of Saudi Arabia, May 14-16, 9 p.; and see Siddiqui, S., and Khamees, A. A., 2005, Data visualization challenges for displaying laboratory core and flow data in three-dimensions: SPE preprint 106334, presented at the SPE Technical Symposium of Saudi Arabia, May 14-16, 9 p. Coles et al. (1996), Fredrich et al. (2006), and Fredrich et al. (2007) used synchrotron-computed microtomography to build numerical 3D models of pore networks in natural and synthetic sandstones. See Coles, M. E., Hazlett, R. D., Muegge, R. L., Jones, K. W., Andrews, B. Dowd, B. Siddons, P., Peskin, A., Spanne, P., and Soll, W. E., 1996, Developments in synchrotron X-ray microtomography with applications to flow in porous media: SPE preprint 36531, presented at the SPE Annual Technical Conference and Exhibition, Denver, Colo., p. 413-424; see Fredrich, J. T., DiGiovanni, A. A., and Noble, D. R., 2006, Predicting macroscopic transport properties using microscopic image data: Journal of Geophysical Research B: Solid Earth, v. 111, Issue 3; and see Fredrich, J. T., Haney, M. M., and White, J. A., 2007, Predicting petrophysical properties using 3D image data (abs.): AAPG Annual Convention, downloaded at http://www.aapg.org. They used lattice-Boltzmann methods to model permeability.

Multi-point (or multiple-point) statistical methods (MPS) are a new family of spatial statistical interpolation algorithms proposed in the 1990's that are used to generate conditional simulations of discrete variable fields, such as geological facies. See Guardiano, F. and Srivastava, R. M., 1993, Multivariate geostatistics: beyond bivariate moments: Geostatistics-Troia, A. Soares. Dordrecht, Netherlands, Kluwer Academic Publications, v. 1, p. 133-144. A training image is a numerical prior geological model that contains the facies structures and relationships believed to exist in realistic reservoirs. Training images are conceptual in nature and can be as simple as a hand-drawn map, or they can be created by computer tools. The original MPS algorithm proposed by Guardiano and Srivastava (1993) built a multiple-point conditional probability distribution function (CPDF) by scanning the training image anew for each simulation node. Because of computer central processing unit (CPU) limitations, this time-consuming algorithm was not practical at that time.

Strebelle (2002) introduced the concept of a search tree, which stores all replicates of patterns found within a template over the training image. See Strebelle, S., 2002, Conditional simulation of complex geological structures using multiple point statistics. Mathematical Geology, v. 34, p. 1-22. Strebelle's (2002) seminal MPS algorithm, called SNESIM, has been used in many applications for reservoir modeling, and has become the reference tool for modeling fluvial channel deposits when combined with rotation and affinity transformations (Zhang, 2002; Caers and Zhang, 2004; Strebelle and Zhang, 2004). See Zhang, T., 2002, Multiple-point simulation of multiple reservoir facies: Unpublished M.S. thesis, Stanford University, California, 163 p.; see Caers, J. and Zhang, T., 2004, Multiple-point geostatistics: A quantitative vehicle for integration of geologic analogs into multiple reservoir models, in M. Grammer, P. M. Harris and G. P. Eberli, eds.: Integration of Outcrop and Modern Analogs in Reservoir Modeling, AAPG. Memoir 80, p. 383-394.; and see Strebelle, S. and Zhang, T., 2004, Non-stationary multiple-point geostatistical models, in Leuangthong, O. and Deutsch, C. V., eds.: Geostatistics, v. 1, p. 235-244.

The seminal MPS algorithm is orders of magnitude faster than Guardiano and Srivastava's (1993) original algorithm, but it is computer random-access memory (RAM) demanding, especially in 3D for a large training image. See Guardiano, F. and Srivastava, R. M., 1993, Multivariate geostatistics: beyond bivariate moments: Geostatistics-Troia, A. Soares. Dordrecht, Netherlands, Kluwer Academic Publications, v. 1, p. 133-144. This RAM limitation in 3D requires compromises that may lead to inadequate shape reproduction of 3D objects. The RAM limitation also prevents us from considering too many categories or classes jointly, thus limiting seminal MPS algorithm to the simulation of categorical variables.

In order to deal with both categorical and continuous variable training images and reduce RAM cost and improve shape reproduction in 3D applications, an MPS algorithm such as FILTERSIM (Zhang 2006a). See Zhang, T., 2006a, Filter-based training image pattern classification for spatial pattern simulation: Unpublished Ph.D. dissertation, Stanford University, California, 153 p. The FILTERSIM algorithm applies a set of local filters to the training image, which can be either categorical or continuous, to group local patterns into pattern classes. It then proceeds to simulate patterns on the basis of that classification. A filter is a local template (window) with a set of weights associated to each pixel location of the template. Applying a filter to a local pattern results in a filter score, the score is viewed as a numerical summary of that local pattern. A set of default or use-defined filters is designed such that each filter can record different aspects of the training pattern seen within the template. These filters are used to transform training patterns into a filter score space. This pattern scoring provides a dimension reduction of patterns. By partitioning that score space of limited dimension, similar training patterns are classified based on their filter scores.

The seminal MPS algorithm is orders of magnitude faster than Guardiano and Srivastava's (1993) original algorithm, but it is computer random-access memory (RAM) demanding, especially in 3D for a large training image. This RAM limitation in 3D requires compromises that may lead to inadequate shape reproduction of 3D objects. The RAM limitation also prevents us from considering too many categories or classes jointly, thus limiting seminal MPS algorithm to the simulation of categorical variables. The seminal MPS algorithm searches for exact replicates of the conditioning data event, builds the reservoir model one pixel at a time, conditioned to a multiple-point data event, and does not allow any filtering or averaging of the patterns found in the training image.

In order to deal with both categorical and continuous variable training images and reduce RAM cost and improve shape reproduction in 3D applications, a new MPS algorithm named FILTERSIM was proposed by Zhang (2006a). The FILTERSIM algorithm applies a set of local filters to the training image, which can be either categorical or continuous, to group local patterns into pattern classes. It then proceeds to simulate patterns on the basis of that classification. A filter is a local template (window) with a set of weights associated to each pixel location of the template. Applying a filter to a local pattern results in a filter score, the score is viewed as a numerical summary of that local pattern. A set of default or use-defined filters is designed such that each filter can record different aspects of the training pattern seen within the template. These filters are used to transform training patterns into a filter score space. This pattern scoring provides a dimension reduction of patterns. By partitioning that score space of limited dimension, similar training patterns are classified based on their filter scores.

The FILTERSIM algorithm starts with a classification of local training patterns in a filter score space of reduced dimension. Simulation proceeds along a sequential path through the simulation space, by determining which pattern class is most similar to the local conditioning data event, sampling a specific pattern from the pattern class, and then patching the sampled pattern onto the image at the simulation sites. The simulation random path and the sampling of patterns from pattern classes allow for different simulated realizations, yet all are conditional to the same original data. Because of the dimension reduction brought by the filter summaries of any pattern, and because patterns are grouped into classes, the algorithm is fast and reasonable in terms of RAM demand.

The seminal MPS algorithm and FILTERSIM algorithm are able to honor absolute or so-called "hard" constraints from data acquired in wells or outcrops, and conditional or "soft" constraints from seismic data, facies probability fields, and rotation and affinity (or scale) constraint grids. All of these data are used in the stochastic modeling process to generate 1D, 2D, or 3D maps of geological facies or rock properties. Because there is a random component involved in MPS simulations, individual realizations of property fields created by MPS algorithms differ, but the ensemble of realizations provides geoscientists and reservoir engineers with improved quantitative estimates of the spatial distribution and uncertainty of geological facies in a modeled reservoir volume. Moreover, these algorithms honor both hard and soft input data constraints (Zhang, 2006a). See Zhang, T., Switzer P., and Journel A., 2006b, Filter-based classification of training image patterns for spatial pattern simulation: Mathematical Geology, v. 38, p. 63-80.

Six directional 2D default filters that are typically used in FILTERSIM (Zhang, 2006a; Zhang et al., 2006b) (both noted above). There are three types of filters: average filter, gradient filter and curvature filter, and each type of filter are used for both horizontal and vertical directions. Average filters aim at localizing features; gradient filters are used to detect feature boundaries by highlighting the contrast of different features (the first-order difference); curvature filters supply the second-order difference of features.

In order to reflect large-scale structure, multi-grid simulation is used. This progressively simulates each level of the multi-grid from coarser to finer with the finer-grid simulation being constrained by previously simulated values at coarser grids. At each level of the simulation, rescaled filters are applied over the respective grid (Zhang, 2006a).

There are two types of training images: one with a very limited number of categories and another for continuous variables such as reservoir petrophysical properties. Multipoint geostatistical methods require 1D, 2D, or 3D grids of training images as prior conceptual geological models that contain patterns of the spatial attributes under study. The shapes of different features appearing on the images are supposed to represent a model of real geological features, with each category typically representing a different geological facies or different kind of geological body. Training images are typically required to contain "stationary" patterns, i.e., the patterns must be independent of their location in space (invariant according to any translation) and must be repetitive over the training image area. In the case of training images used for geological modeling, this stationarity can consist, but is not limited to, geological object orientation stationarity (where directional objects/features do not rotate across the image) and geological scale stationarity (where the size of objects/features on the image does not change across the image) (Caers and Zhang, 2004). See Caers, J. and Zhang, T., 2004, Multiple-point geostatistics: A quantitative vehicle for integration of geologic analogs into multiple reservoir models, in M. Grammer, P. M. Harris and G. P. Eberli, eds.: Integration of Outcrop and Modern Analogs in Reservoir Modeling, AAPG. Memoir 80, p. 383-394.

An issue raised implicitly by current MPS algorithms is how to generate training images. Training images are supposed to model or reproduce real geological features and should as much as possible be derived from existing geologically meaningful images. This requires research on statistical and image-processing methods that will allow use of images from any source, e.g., hand-drawn sketches, aerial photographs, satellite images, seismic volumes, geological object models, physical scale models, or forward geological process models. Compared to the creation of continuously variable training images, generating categorically variable training images is easier. An object-based approach is commonly used to generate training images with categorical variables. A region-based approach, combined with adding desired constraints, can be used to generate continuously variable training mages (Zhang et al., 2005). See Zhang, L., Nair, N., Jennings, J. W., and Bryant, S. L., 2005, Models and methods for determining transport properties of touching-vug carbonates: SPE preprint 96027, presented at the SPE Annual Technical Conference and Exhibition, Dallas, Tex., October 9-12, 9 p.

In order to perform MPS simulation, training images must be stationary. However, in most reservoir modeling applications, geological sediments show non-stationary patterns/features, which reflect reservoir heterogeneities and anisotropies of sedimentation.

SUMMARY OF THE INVENTION

The present invention relates to a method to generate 3-dimensional (3D) computer models of rocks and pores, known as numerical pseudocores. The technique uses fullbore images, digital rock samples, and multi-point statistics (MPS) to reconstruct a 3D pseudocore for a logging interval where there is no real core collected, but there are logged borehole images. The digital core samples are used to guide the 3D feature reconstruction of the pseudocores by multiple-point geostatistics and the final pseudocores are constrained by the fullbore images.

Further features and advantages of the invention will become more readily apparent from the following detailed description when taken in conjunction with the accompanying drawing.

BRIEF DESCRIPTION OF THE DRAWINGS

The application file contains at least one drawing executed in color. Copies of this patent or patent application publication with color drawings will be provided by the Office upon request and payment of the necessary fee.

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1a shows a training image defined as 3 foot (or 1 meter) interval of a borehole-image log, in particular, of a single-pass formation micro-imager (FMI) in a vuggy carbonate formation, according to at least one embodiment of the invention;

FIG. 1b illustrates the result of a Multi-Point Simulation (MPS) using FILTERISM of the same training image of FIG. 1a, according to at least one embodiment of the invention;

DETAILED DESCRIPTION OF THE PREFERRED EMBODIMENTS

Figures 2A, 2B:
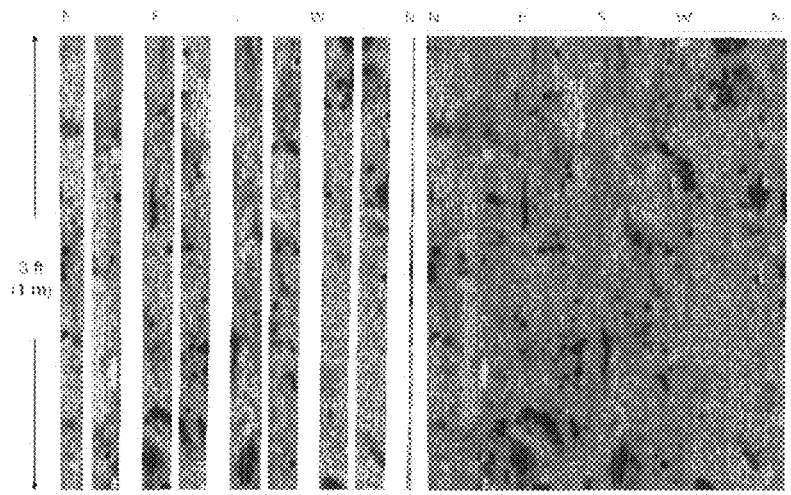
FIG. 2a shows the same training image of FIG. 1a, according to at least one embodiment of the invention.
FIG. 2b illustrates the result of a first realization of the training image of FIG. 1a and matches the original, measured data of the vuggy formation of FIG. 1, such that the measured date are honored in the first (FIG. 2a), second (FIG. 2b) and third (FIG. 2c) realizations which provide subtle variations in the modeled areas, according to at least one embodiment of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements. Further, the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention relates to a method to generate 3-dimensional (3D) computer models of rocks and pores, known as numerical pseudocores. The technique uses fullbore images, digital rock samples, and multi-point statistics (MPS) to reconstruct a 3D pseudocore for a logged interval where there is no real core collected, but there are borehole images. The digital rock samples are used to guide the 3D feature reconstruction of the pseudocores by multiple-point geostatistics and the final pseudocores are constrained by the fullbore images.

According to an aspect of the invention, the seminal idea lies in the use of training image: we directly use the data themselves [in fullbore creation, it is the original 2D incomplete image (continuous variable training image) that has >60% coverage of the entire region, while in the pseudocore reconstruction, the Catscan digital core is directly used as a 3D training image that is combined later with the fullbore image data]. Hence, the entire process of applying MPS becomes data-driven. This advantage should be stressed in our patent memo and provisions Borehole images produce oriented electrical and acoustic maps of the rocks and fluids encountered by a borehole. Fullbore images are complete, 360-degree views of the borehole wall. By design, most acoustic and logging-while-drilling tools generate fullbore images. Most resistivity image logs need to have fullbore images modeled because gaps exist between pads, and there may be damage to certain electrodes or pads. The modeling process uses continuous-variable algorithms developed within MPS. Fullbore images provide the physical location of features, such as bed boundaries, pores, and conductive and resistive patches within the rock on the borehole wall. These outline complex 3D volumes, known as petrophysical facies.

Digital rocks or core samples can be generated from 2-dimensional thin sections, scanning-electron-microscope images, confocal-microscope images, or computer-generated sphere packs. Most digital rocks or core samples, however, are generated from computed-tomographic scans (CTscans) of rocks and fluids. Tomographic images are created when the scanner transmits X-rays at different angles through the rock to a receiver. X-ray attenuation is converted to density, and serial sections are built into 3D views of the rocks and pores. According to an aspect of the invention, each digital core sample, for example, a CTscan, is directly taken as a training image. These are discrete variable training images with the attribute being the rock (white) or pore (black) at each pixel of the image. The training image can have any shape of boundaries or contain any number of irregular holes.

Numerical pseudocores are created using discrete-variable algorithms within MPS. Integer values are assigned to each petrophysical facies, such as rock (0), pores (1), and conductive patches (2). Digital rock or core samples are used as training images, i.e., the quantitative templates used to model property fields. Fullbore images surround the numerical pseudocore with cylindrical envelopes to condition the models. Each numerical pseudocore absolutely honors the digital rock or core samples and fullbore images. Numerical pseudocores can be gridded into models suitable for fluid-flow simulations. Capillary pressure and relative permeability curves are provided by conceptual models, special core analysis, or established techniques of fine-scale pore-network modeling.

FIG. 1a is a training image defined as a 3 foot (1 meter) interval of a borehole-image log, of a single-pass formation micro-imager (FMI) in a vuggy carbonate formation. Vugs are pores that are filled with water-based drilling mud, and they appear as dark, low-resistivity spots. Note the gaps between the pads in FIG. 1a. For illustration, the pixel-based, user-defined 3×3 template (bottom) is moved through the training image, detecting patterns and giving filter scores to the neighborhoods around each measured pixel. This provides the basis for MPS simulation using FILTERSIM. The Fullbore image in FIG. 1b shows a FILTERSIM realization that uses the entire image of FIG. 1a as a training image. The realization is conditioned so that it perfectly matches the original, measured data. Orientations are shown along the tops of the images. Abbreviations: N=north; E=east; S=south; and W=west. No vertical exaggeration. Bit size is 8.5 in (21.5 cm). In particular, FIG. 1b illustrates the result of a Multi-Point statistics (MPS) using FILTERISM of the same training image of FIG. 1a. Thus, by using FILTERSIM, we determine filter scores for each training image using a suitable pixel-based template. These scores quantify the patterns and their probabilities, as observed in the measured data, then generate fullbore-image realizations using the FILTERSIM algorithm of multi-point statistics (FIG. 1a).

Figures 2C, 2D:
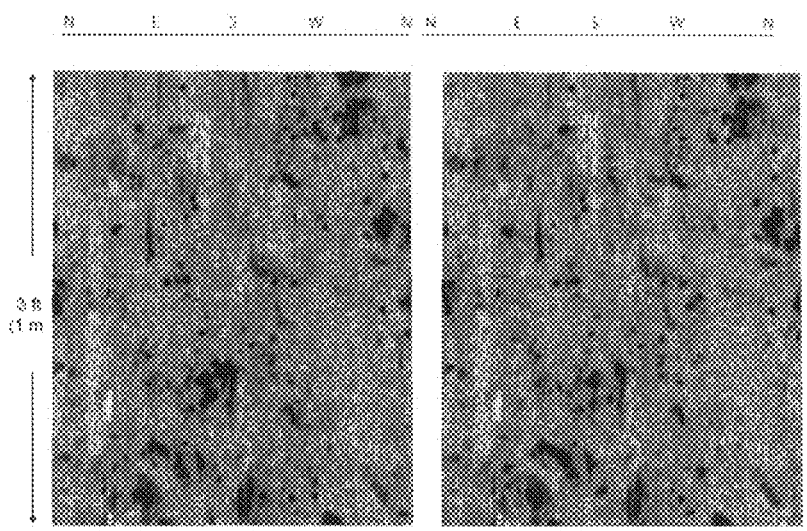
FIG. 2c illustrates the result of a second realization of the training image of FIG. 1a and matches the original, measured data of the vuggy formation of FIG. 1a, according to at least one embodiment of the invention.
FIG. 2d illustrates the result of a third realization of the training image of FIG. 1a and matches the original, measured data of the vuggy formation of FIG. 1a, according to at least one embodiment of the invention.

FIGS. 2b, 2c and 2d show three realizations of a fullbore image in a vuggy carbonate formation, wherein FIG. 2a shows the same training image of FIG. 1a. Note that the measured data are honored in each realization, and there are subtle variations in the modeled areas. FIG. 2b illustrates the result of a first realization of the training image of FIG. 2a and matches the original, measured data of the vuggy formation of FIG. 1a. FIG. 2c illustrates the result of a second realization of the training image of FIG. 2a and matches the original, measured data of the vuggy formation of FIG. 1a. FIG. 3d illustrates the result of a third realization of the training image of FIG. 2a and matches the original, measured data of the vuggy formation of FIG. 1a.

Figures 3A, 3B:
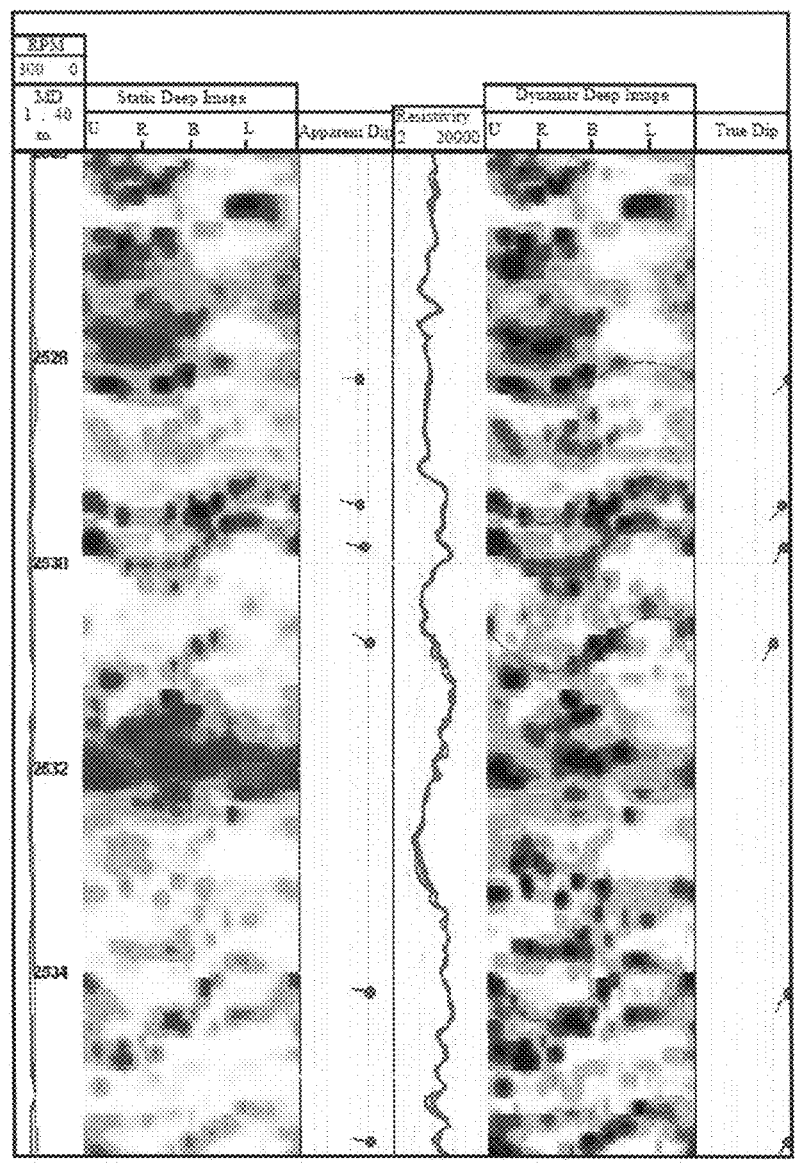
FIG. 3a shows a static image of vugs appearing as dark features in the logging-while drilling (LWD) images of a vuggy carbonate, such that conductive patches are illustrated in brown and non-conductive patches illustrated in white, according to at least one embodiment of the invention.
FIG. 3b shows a dynamic image of vugs appearing as dark features in the logging-while drilling (LWD) images of a vuggy carbonate, such that conductive patches are illustrated in brown and non-conductive patches illustrated in white, according to at least one embodiment of the invention.

FIG. 3a shows a static image of vugs appearing as dark features in the logging-while drilling (LWD) images of a vuggy carbonate (see Xiao, L., Jun, C., Duo, Y. S., Han, S. Y., Xia, W. H., and Xi, W. Y., 2007: Fully integrated solution for LWD resistivity image application a case study from Beibu Gulf, China: 1$^{st}$ SPWLA India Regional Conference, Formation Evaluation in Horizontal Wells, Mumbai, March 19-20, 10 p.), such that conductive patches are illustrated in brown and non-conductive patches illustrated in white. FIG. 3b shows a dynamic image of vugs appearing as dark features in the logging-while drilling (LWD) images of a vuggy carbonate, such that conductive patches are illustrated in brown and non-conductive patches illustrated in white. Dehghani et al. (1999) suggested that zones of enhanced porosity and permeability exist in the vicinity of vugs. See Dehghani, K., Harris, P. M., Edwards, K. A., and Dees, W. T., 1999, Modeling a vuggy carbonate reservoir: AAPG Bulletin, v. 83, p. 19-42.

Figure 4:
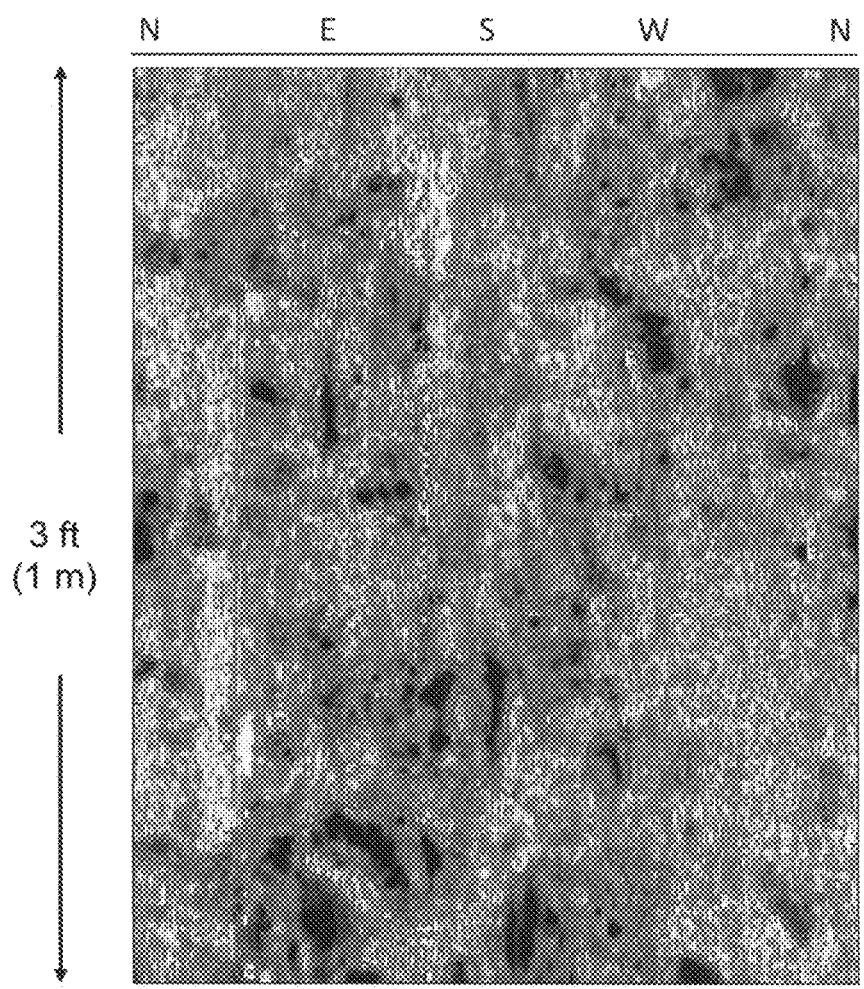
FIG. 4 shows a Fullbore image of vuggy porosity of FIG. 1a that shows contours (green lines) that outline the less-resistive areas of the electrical image, according to at least one embodiment of the invention.

FIG. 4 Fullbore image of vuggy porosity (same as FIGS. 1 and 2) shows contours (green lines) that outline the less-resistive areas in the electrical image. Orientations are shown along the tops of the image. Abbreviations: N=north; E=east; S=south; and W=west. No vertical exaggeration. Bit size is 8.5 in (21.5 cm).

Figure 5A:
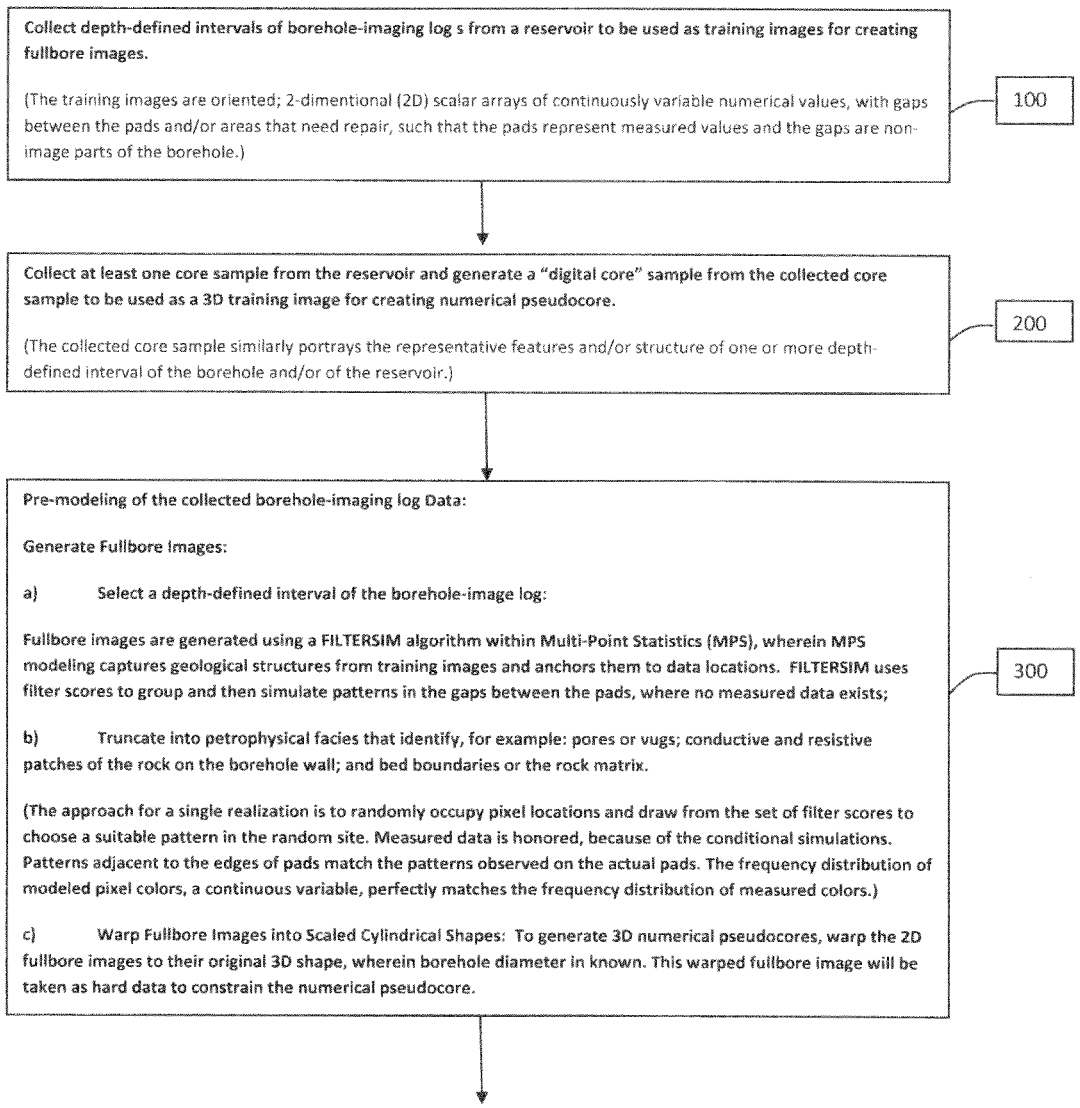
FIGS. 5a and 5b show a block diagrammatical view of the method to generate numerical pseudocores using borehole images, digital rock samples and multi-point statistics, according to at least one embodiment of the invention.
Figure 5B:
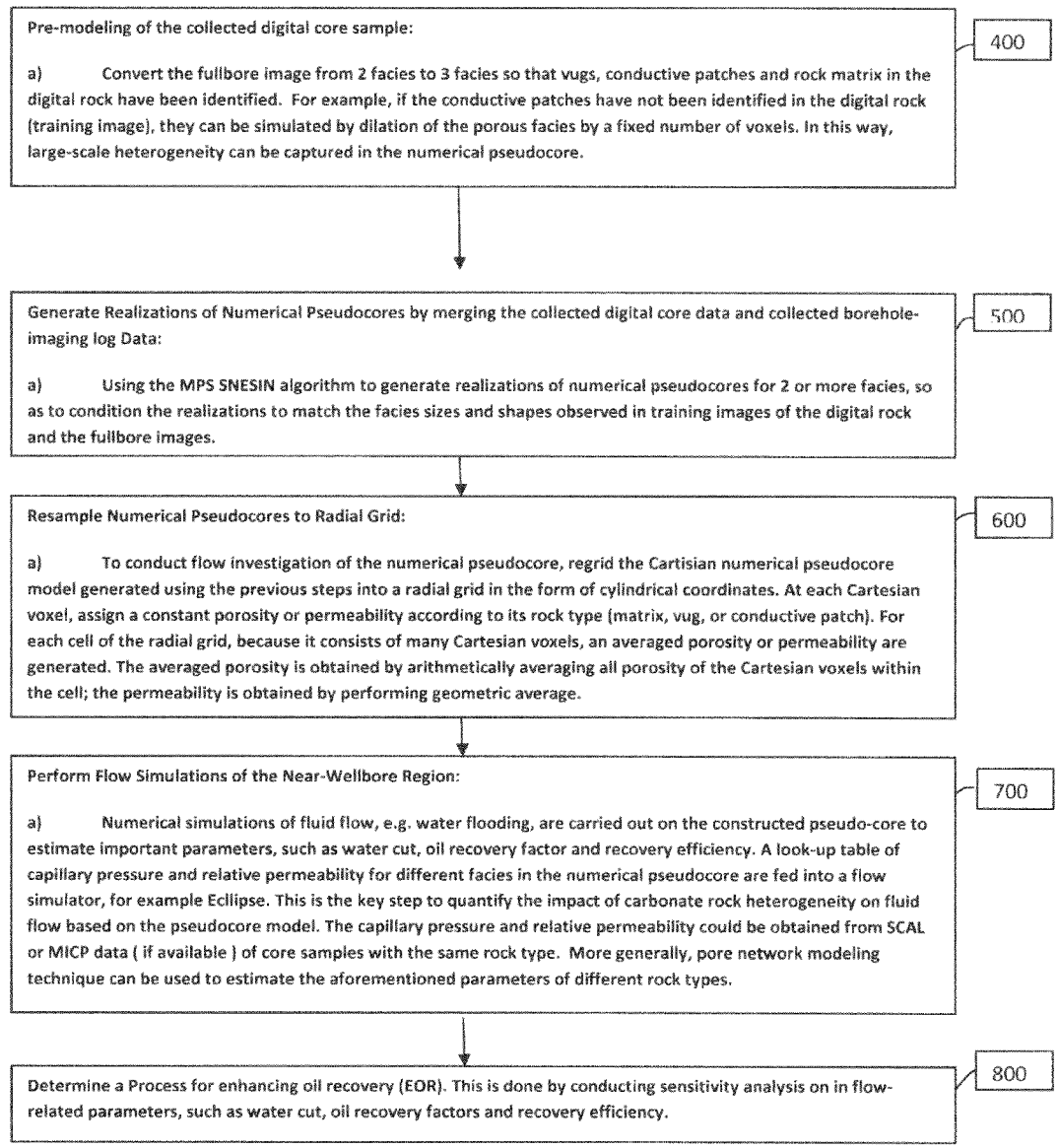

FIG. 5 shows a block diagrammatical view of the method to generate numerical pseudocores using borehole images, digital rock samples and multi-point statistics. Step 100 includes collecting depth-defined intervals of borehole-imaging logs from a reservoir that can be used as training images. The training images are oriented; 2-dimentional (2D) scalar arrays of continuously variable numerical values, with gaps between the pads and/or areas that need repair, such that the pads represent measured values and the gaps are non-image parts of the borehole.

Still referring to Step 100 of FIG. 5, the original Fullbore images are generated by certain logging tools, such as acoustic devices and logging-while-drilling tools. In other cases, fullbore images must be generated. This is especially true for resistivity logs, which commonly have gaps between the pads.

Also referring to Step 100 of FIG. 5, an according to an aspect of the invention, to select a depth-defined interval of the borehole-image log, for example, the interval could be 1, 3, or 10 ft (0.3, 1, or 3 m) of measured depth. The user may want to choose a thick or thin interval, depending on the observed amount of layering, fracturing, and other heterogeneous patterns.

Fullbore images can be generated using the FILTERSIM algorithm within MPS as noted in Step 100 of FIG. 5. FILTERSIM uses filter scores to group and then simulate patterns in the gaps between the pads, where no measured data exist. The approach for a single realization is to randomly occupy pixel locations, and draw from the set of filter scores to choose a suitable pattern for the random site. Measured data are perfectly honored, because these are conditional simulations. Patterns adjacent to the edges of pads match the patterns observed on the actual pads. The frequency distribution of modeled pixel colors, a continuous variable, perfectly matches the frequency distribution of measured colors.

Step 200 of FIG. 5 includes collecting at least one core sample from the reservoir and then generating a digital core sample from the collected core sample. The collected core sample similarly portrays the representative features and/or structure of one or more depth-defined interval of the borehole and/or of the reservoir. For example, digital rocks or core samples, such as CTscans, can be used as training images. Training images are 3D arrays of discrete numerical values. In a 2-facies model, for example, the rock has a numerical value of 0, and the pores have a numerical value of 1. In a 3-facies model, the rock has a numerical value of 0, the pores have a numerical value of 1, and the conductive patches have a numerical value of 2. There is no limit on the number of facies. Outlines of individual facies bodies (volumes) can have any shape or size.

Step 300 of FIG. 5 includes pre-modeling of the collected borehole-imaging log Data such as generating fullbore images.

Step 300*a* of FIG. 5 discloses making a selection of a depth-defined interval of the borehole-image log. Fullbore images are generated using a FILTERSIM algorithm within Multi-Point Statistics (MPS), wherein MPS modeling captures geological structures from training images and anchors them to data locations. FILTERSIM uses filter scores to group and then simulate patterns in the gaps between the pads, where no measured data exists.

Step 300*b* of FIG. 5 discloses truncating into petrophysical facies that identify, for example: pores or vugs; conductive and resistive patches of the rock on the borehole wall; and bed boundaries or the rock matrix. The approach for a single realization is to randomly occupy pixel locations and draw from the set of filter scores to choose a suitable pattern in the random site. Measured data is honored, because of the conditional simulations. Patterns adjacent to the edges of pads match the patterns observed on the actual pads. The frequency distribution of modeled pixel colors, a continuous variable, perfectly matches the frequency distribution of measured colors.

Step 300*c* of FIG. 5 discloses warping the Fullbore Images into Scaled Cylindrical Shapes. In particular, for routine interpretations, it is difficult to examine borehole images in 3D. Therefore, it is common to split the borehole along true north, and then unroll the cylinder until it becomes a 2D view. In highly deviated and horizontal wells, it is common to split the borehole image along the top of the hole. Planar features that intersect the cylindrical borehole appear as sine waves in the 2D view. To generate 3D numerical pseudocores, we need to warp the 2D fullbore images to their original 3D shape. To do this, we must know the borehole diameter. We can easily determine this from caliper logs that are run with the original borehole image. The images must be 1:1 in scale, that is, there is no vertical exaggeration.

Step 400 of FIG. 5 discloses pre-modeling of the collected digital core sample. Step 400*a*, converts from 2 facies to 3 facies so that the pores or vugs, conductive patches and rock matrix in the digital rock have been identified. For example, if the conductive patches have not been identified in the digital rock (training image), they can be simulated by dilation of the porous facies by a fixed number of voxels. In this way, large-scale heterogeneity can be captured in the numerical pseudocore. Typically, the voxel resolution of the digital rock or core training image is finer than the fullbore image resolution. To ensure the resulting pseudocore model to have features in scales consistent with the fullbore image, the training image is coarsely sampled according to the ratio of the resolutions of the digital core to the fullbore image.

Step 500 of FIG. 5 discloses generating realizations of numerical pseudocores by merging the structures borrowed from the collected digital core data and collected borehole-imaging log data. Step 500*a* discloses using the MPS SNESIM algorithm to generate realizations of numerical pseudocores for 2 or more facies, so as to condition the realizations to match the facies sizes and shapes observed in training images of the digital rock and the fullbore images. More than 2 facies can be modeled in cases where the conductive patches have been mapped (FIGS. 3 and 4) in the fullbore images and the digital rocks. If the conductive patches have not been identified in the digital rock (training image); they can be simulated by dilation of the porous facies by a fixed number of voxels. In this way, large-scale heterogeneity can be captured in the numerical pseudocore. The radial size and height of the numerical pseudocore is limited only by the amount of computer memory that is available.

Step 600 of FIG. 5 discloses resampling numerical pseudocores to a radial grid. To conduct flow investigation of the numerical pseudocore, regrid the Cartisian numerical pseudocore model generated using the previous steps into a radial grid in the form of cylindrical coordinates. At each Cartesian voxel, assign a constant porosity or permeability according to its rock type (matrix, vug, or conductive patch). For Cartesian each cell of the radial grid, because it consists of many Cartesian voxels, averaged porosities and permeabilities are generated. The averaged porosity is obtained by arithmetically averaging all porosity of the Cartesian voxels within the cell; the permeability is obtained by performing geometric average.

Step 700 of FIG. 5 discloses perform flow simulations of the near-wellbore region. Numerical simulations of fluid flow, e.g. water flooding, are carried out on the constructed pseudo-core to estimate important parameters, such as water cut, oil recovery factor and recovery efficiency. A look-up table of capillary pressure and relative permeability for different facies in the numerical pseudocore provides values that are fed into a flow simulator, for example Ecllipse. This is the key step to quantify the impact of carbonate rock heterogeneity on fluid flow based on the pseudocore model. The capillary pressure and relative permeability could be obtained from SCAL or MICP data (if available) of core samples with the same rock type. More generally, pore network modeling technique can be used to estimate the aforementioned parameters of different rock types.

Step 800 of FIG. 5 discloses determining a process for improving wetability effects in estimate parameters, such as water cut, oil recovery factors and recovery efficiency.

Figure 6:
FIG. 6 shows the training image of FIG. 1a in a translucent, 3D view of a CT scan of slabbed vuggy carbonate sample (approximate 6 inches in height and 4 inches in diameter), such that the vugs are illustrated in red to gray and the rock matrix illustrated in blue, according to an embodiment of the invention.

FIG. 6 shows the training image of FIG. 1*a* in a translucent, 3D view of a CTscan of slabbed vuggy carbonate sample (approximate 6 inches in height and 4 inches in diameter), such that the vugs are illustrated in red to gray and the rock matrix illustrated in blue. FIG. 6 also shows the chosen training image, a CTscan of a vuggy carbonate (Gowelly, S., 2003, 3-D analysis of vug connectivity, Indian Basin field, New Mexico: Unpublished M.S. thesis, Colorado School of Mines, Golden, Colo.). It is noted that FIG. 1*a* shows a 3-ft (1-m) interval of a borehole-image log, from the same depth and in the same formation, and that vugs are large, irregular pores, visible to the naked eye. Further still, in a borehole-image log, vugs can appear as dark spots because they are filled with water-based drilling mud, and they conduct electricity.

Figure 7:
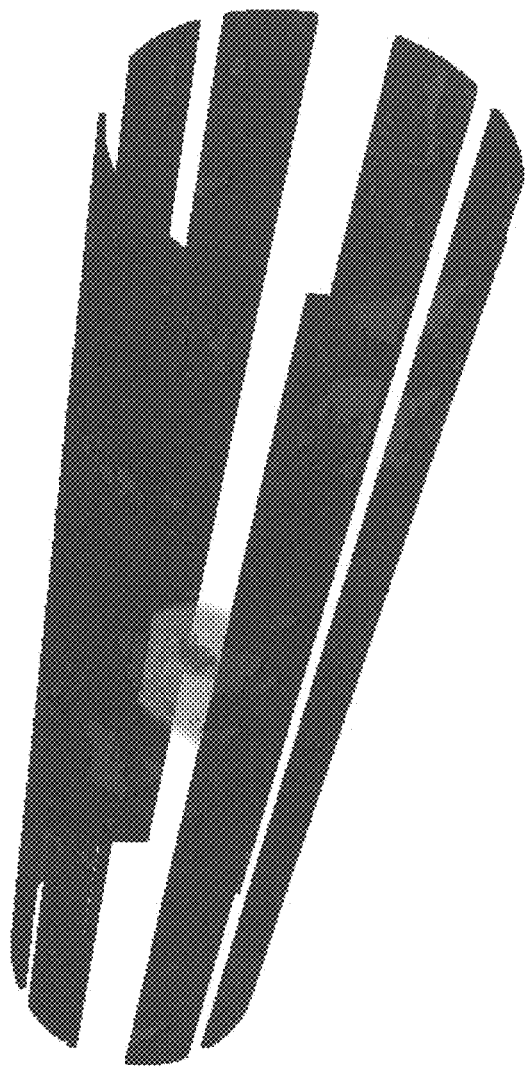
FIG. 7 shows borehole images warped to cylindrical shape, matching a borehole diameter (approximate borehole diameter 8.5 inches and approximate length in interval 3 feet or 1 meter), at a particular depth. CT scan training image of FIG. 6 is correctly scaled and poisoned at its correct depth in the center of the borehole images; wherein the vugs are illustrated in red and the rock matrix illustrated in light blue, according to embodiments of the invention.

FIG. 7 shows borehole images warped to cylindrical shape, matching a borehole diameter (approximate borehole diameter 8.5 inches and approximate length in interval 3 feet or 1 meter), at a particular depth. CT scan training image of FIG.

6 is correctly scaled and poisoned at its correct depth in the center of the borehole images, wherein the vugs are illustrated in red and the rock matrix illustrated in light blue. As noted above, the borehole images are warped to the 3D cylindrical shape, such that the fullbore images are not shown, because it allows a view at the relative scales of the training image (CTscan) (in the center of the cylinder) and the log image. To view the simulation of the numerical pseudocore (see below FIG. 8), it will be noted that the training image and the fullbore images are used.

Figure 8:
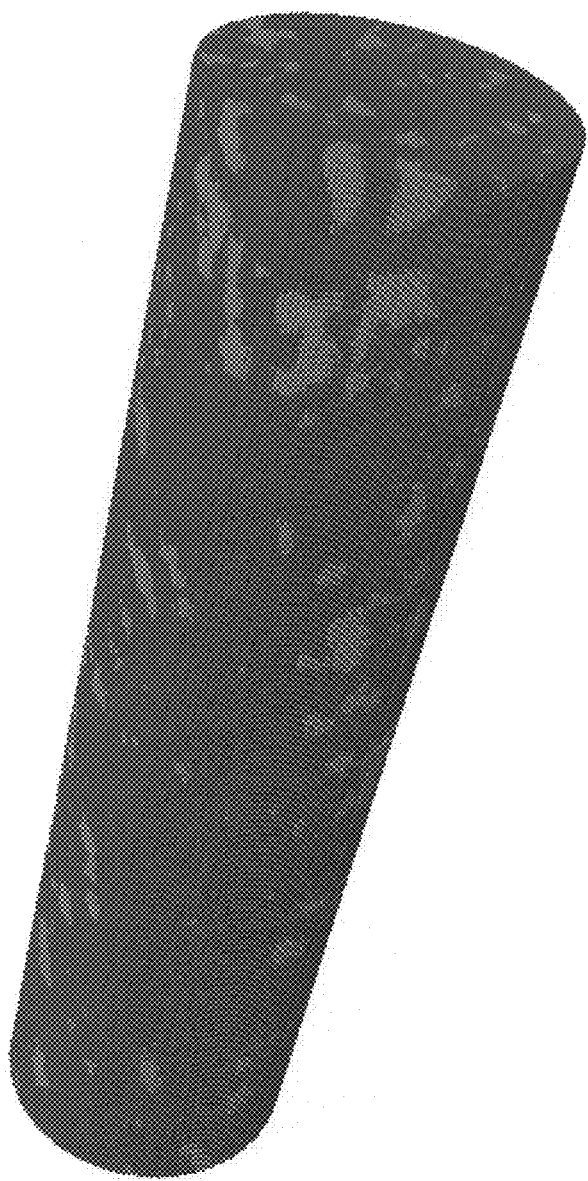
FIG. 8 illustrates the result of a numerical two-facies pseudocore generated from the training image and fullbore image that corresponds to FIG. 7, such that the vugs are illustrated in red and the rock matrix illustrated in dark blue, according to embodiments of the invention.

FIG. 8 illustrates the result of a numerical pseudocore generated from the training image and fullbore image that corresponds to FIG. 7, such that the vugs are illustrated in red and the rock matrix illustrated in dark blue. It is noted that the length of the interval can be 3 feet (1 meter), and the borehole diameter can be 8.5 inches (22 cm).

Figure 9:
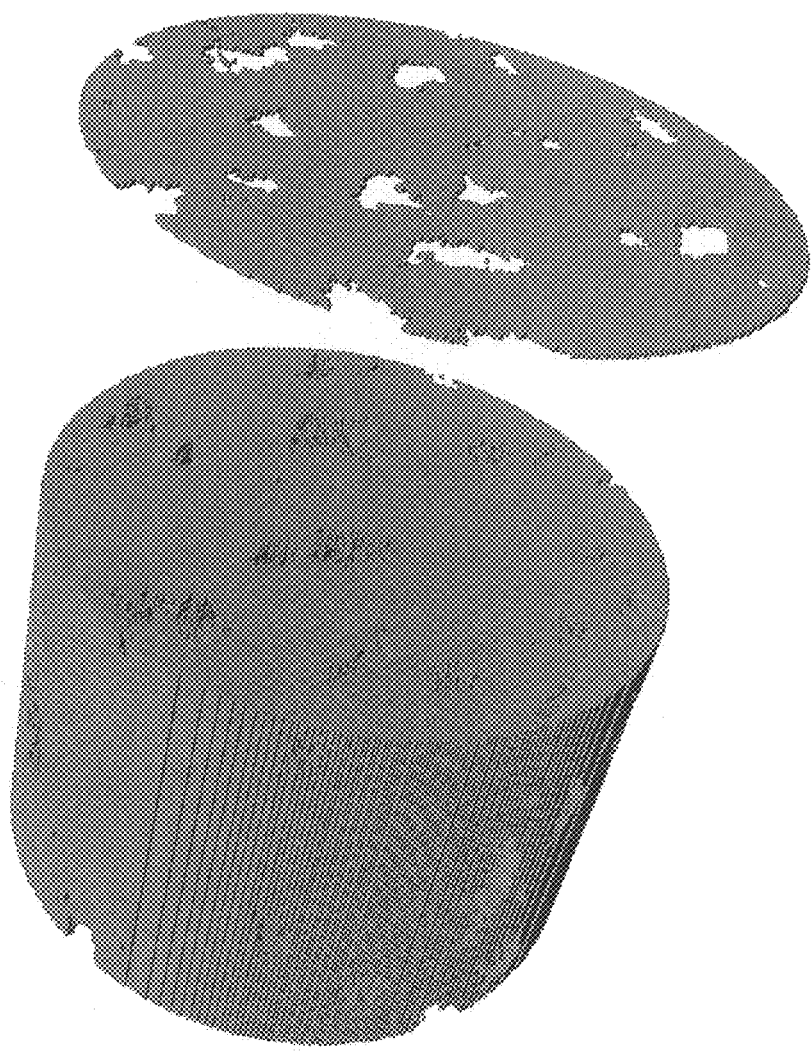
FIG. 9 illustrates the result of a numerical pseudocore generated from the training image and fullbore image that corresponds to FIG. 7, such that the vugs are invisible and the rock matrix illustrated in gray. The arbitrary suspended slice (see top of FIG. 9) shows that this is a 3D model, with an abundant of pores in every slice (approximate length of interval is 1 foot or 0.3 meters and an approximate borehole diameter of 8.5 inches), according to embodiments of the invention.

FIG. 9 illustrates the result of a numerical pseudocore generated from the training image and fullbore image that corresponds to FIG. 7, such that the vugs are invisible and the rock matrix illustrated in gray. Further, the arbitrary suspended slice (see top of FIG. 9) shows that this is a 3D model, with an abundant of pores in every slice (approximate length of interval is 1 foot or 0.3 meters and an approximate borehole diameter of 8.5 inches).

Figure 10:
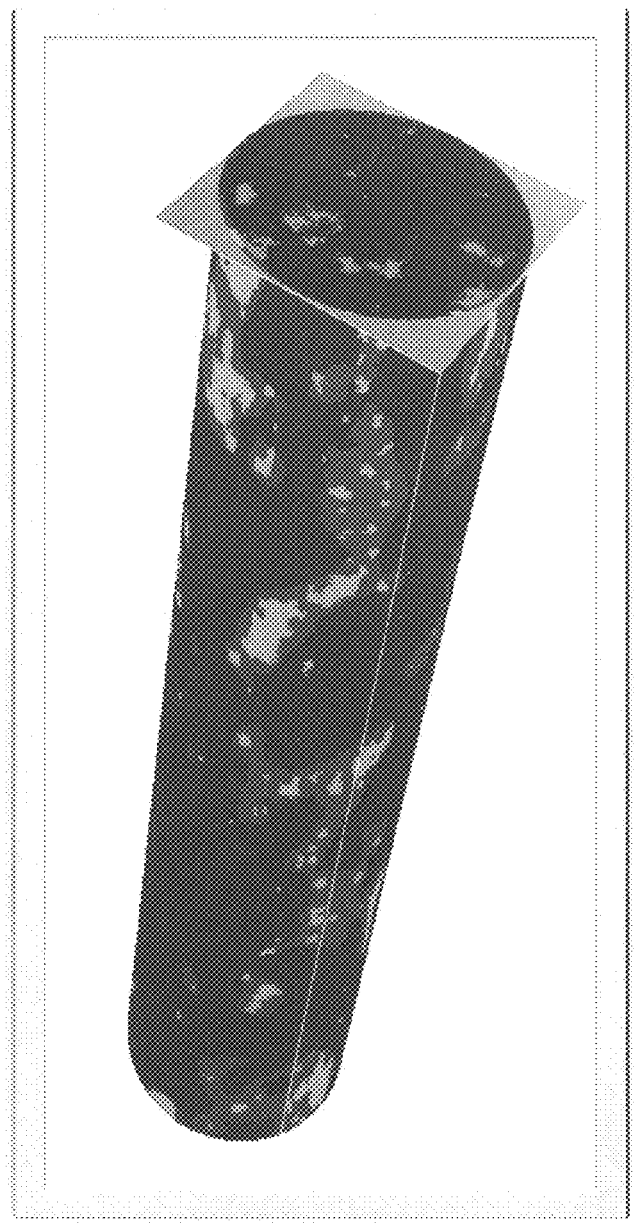
FIG. 10 illustrates the result of a numerical pseudocore generated from the training image and fullbore image that corresponds to FIG. 6. Conductive patches (illustrated in red) resemble contours around conductive patches as shown in FIG. 4. It is noted three petrophysical facies are shown: pores or vugs (illustrated in green), conductive patches (illustrated in red), and rock matrix (illustrated in blue), according to embodiments of the invention.

FIG. 10 illustrates the result of a numerical pseudocore generated from the training image and fullbore image that corresponds to FIG. 6. The numerical pseudocore (see FIG. 9) shows using a circular dilation with an 8-pixel radius around each pore. Conductive patches (illustrated in red) resemble contours around conductive patches as shown in FIG. 4. This model, therefore, has 3 petrophysical facies: pores or vugs (illustrated in green), conductive patches (illustrated in red), and rock matrix (illustrated in blue). The conductive patches provide 3D connectivity between the pores or vugs, and allow capturing the heterogeneity that is inherent in most carbonate rocks.

Figure 11:
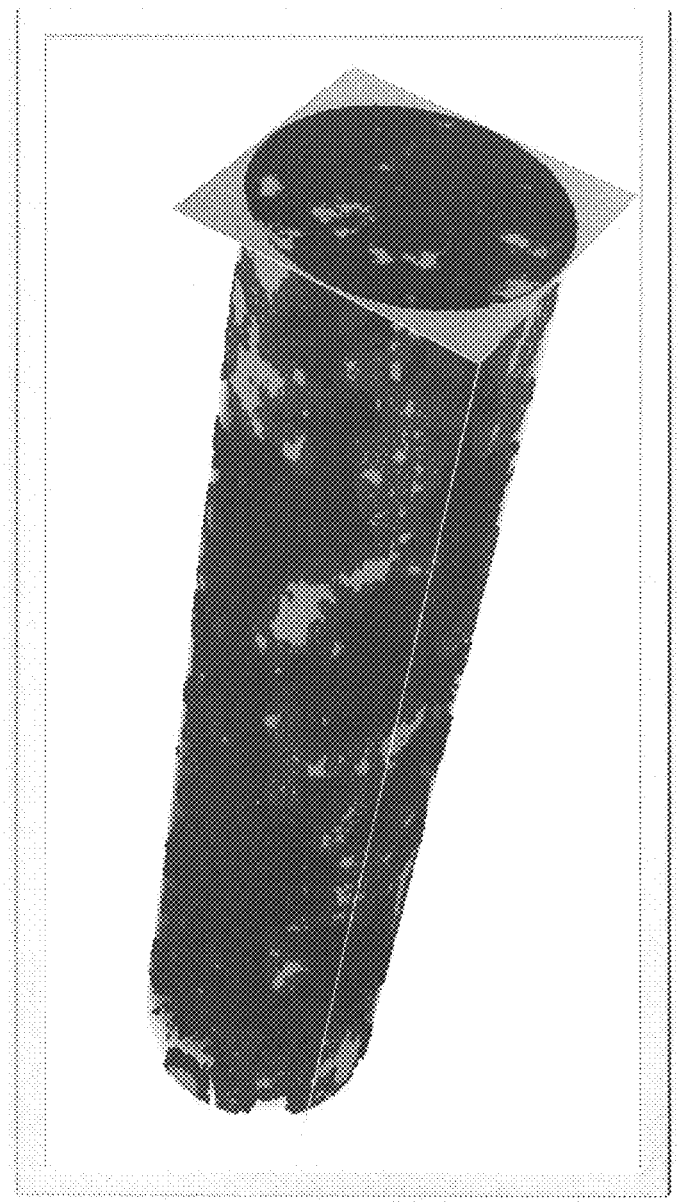
FIG. 11 shows the numerical pseudocore as of FIG. 10, with an invisible rock matrix, which highlights the 3D interconnected nature of the pores or vugs (illustrated in green) and conductive patches (illustrated in red).

FIG. 11 shows the numerical pseudocore as of FIG. 10, with an invisible rock matrix, which highlights the 3D interconnected nature of the pores or vugs (illustrated in green) and conductive patches (illustrated in red). It is noted that the length of the interval can be 3 feet (1 meter), and the borehole diameter can be 8.5 inches (22 cm).

Figure 12:
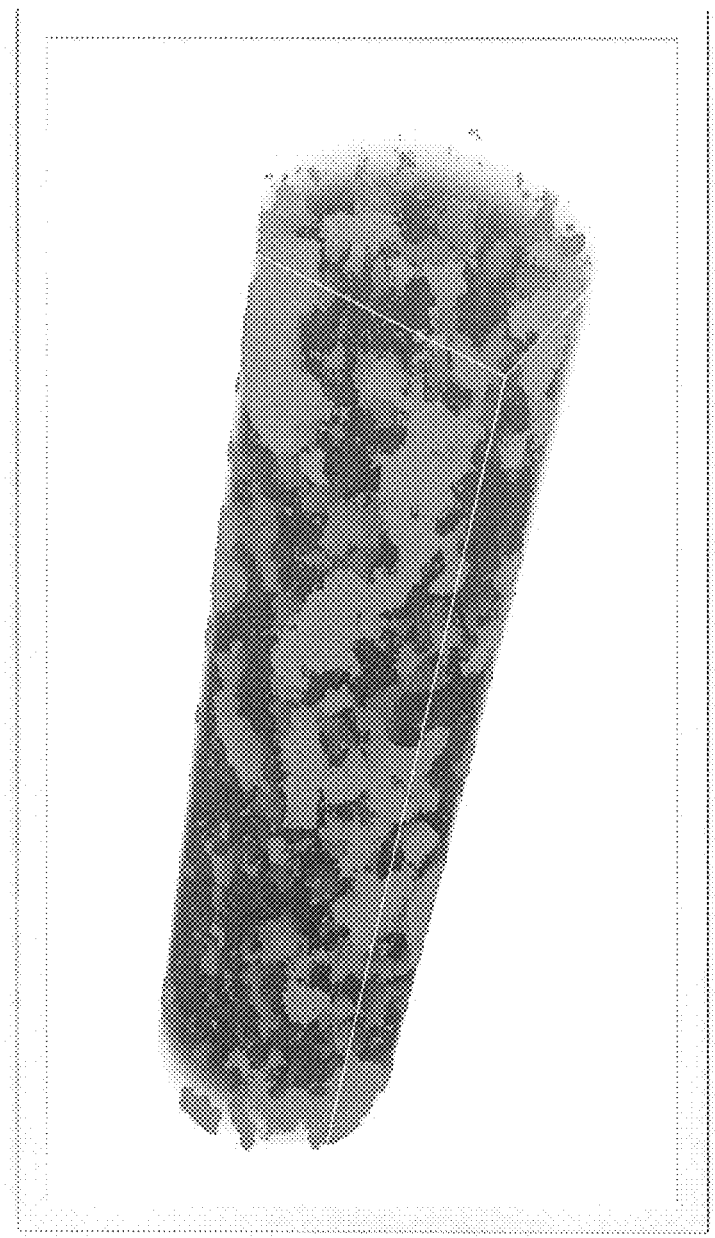
FIG. 12 shows numerical pseudocore as FIG. 10, and the complex 3D shape of the pores or vugs (illustrated green), and both the conductive patches and rock matrix are invisible, according to embodiments of the invention.

FIG. 12 shows the numerical pseudocore as FIG. 10, and the complex 3D shape of the pores or vugs (illustrated green), and both the conductive patches and rock matrix are invisible. It is noted that the length of the interval can be 3 feet (1 meter), and the borehole diameter can be 8.5 inches (22 cm).

Figure 13:
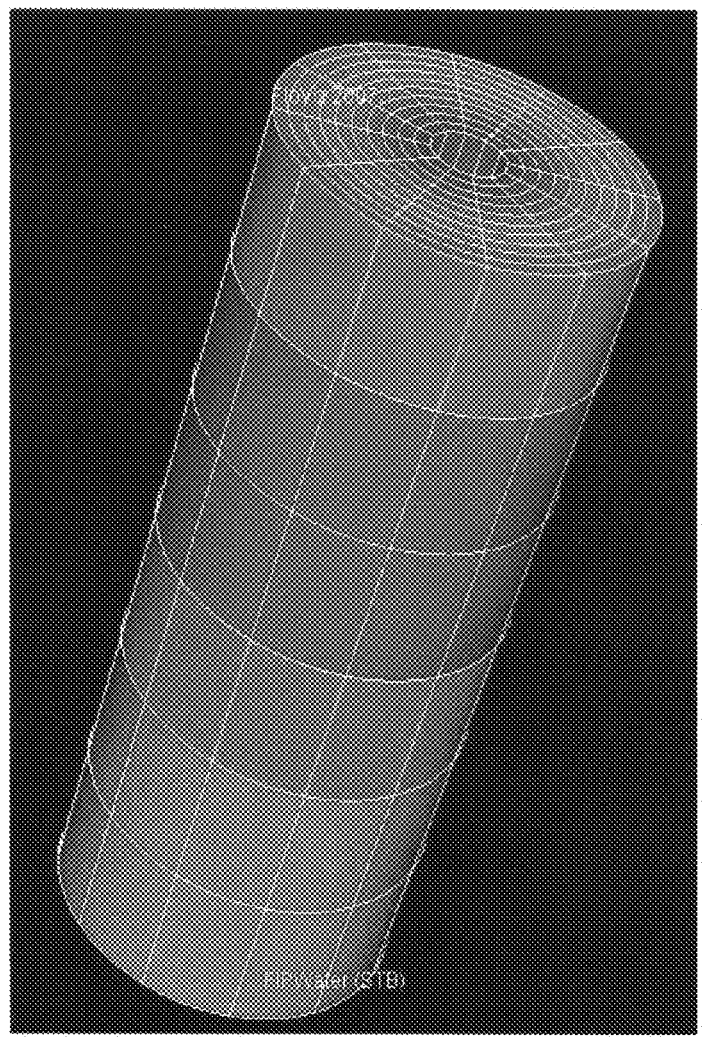
FIG. 13 shows numerical pseudocores that can be resampled or regrided to radial grids wherein the radial grids can be layered, based upon layers observed in borehole images or other well logs, according to embodiments of the invention.

FIG. 13 shows numerical pseudocores that can be resampled or regrided to radial grids wherein the radial grids can be layered, based upon layers observed in borehole images or other well logs. FIG. 13 also shows a radial grid that is generated to investigate the flow behavior of the numerical pseudocore model. Note that an inner part (approximately 4 inches in diameter) of the original numerical pseudocore has been drilled out to allow the arrangement of micro-producers. The micro-injectors can be located around the outer boundary of the pseudocore.

Figure 14A:
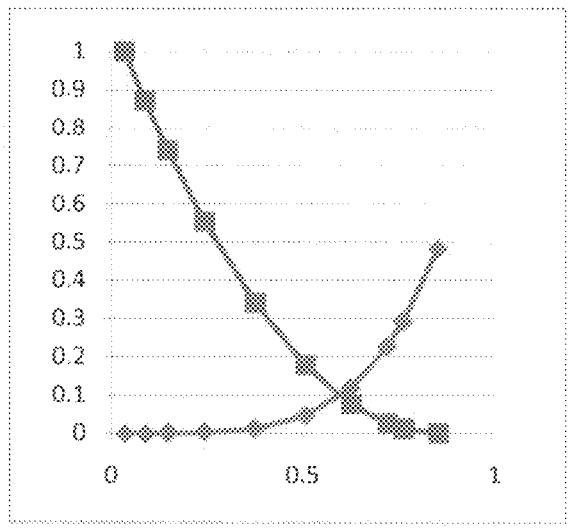
FIG. 14a shows relative permeability curve that is used for conductive patch in the flow simulation; wherein there are three different relative permeability curves for each of the three rock types in the pseudocore model: such as, the vugs, conductive patch and tight rock matrix, according to embodiments of the invention.

FIG. 14a shows relative permeability curve that is used for conductive patch in the flow simulation; wherein there are three different relative permeability curves for each of the three rock types in the pseudocore model: such as, the vugs, conductive patches and tight rock matrix. In particular, FIG. 14a shows the relative permeability curve that was used for the conductive patch in the flow simulation. It is noted the pseudocore for both FIG. 14a and FIG. 14b can be approximately 1 foot (0.3 meters) high, the outer diameter is approximately 8.5 inches (22 cm) (or the width of the core is 8.5 in (22 cm) and the inner diameter is approximately 4 inches.

Figure 14B:
FIG. 14b shows flow simulation result through a numerical pseudocore, such that a line of micro-injectors of water surrounds outer the diameter, a line of micro-producers surrounds the inner diameter of the pseudocore: the colors represent oil saturation (So), where heterogeneous fingering and breakthrough is shown in this flow model, according to embodiments of the invention.

FIG. 14b shows a flow simulation result through a numerical pseudocore, such that a line of micro-injectors of water surrounds outer the diameter, a line of micro-producers surrounds the inner diameter of the pseudocore: the colors represent oil saturation (So), where heterogeneous fingering and breakthrough are shown in this flow model, according to embodiments of the invention. It is noted that FIG. 14b shows the oil saturation profile of a waterflooded numerical pseudocore.

Further, while the present invention has been described with reference to an exemplary embodiment, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for creating a 3-dimensional numerical pseudocore model comprising:

a) obtaining logging data from a reservoir that includes depth-defined intervals of the reservoir, and processing the logging data into a portion of at least one interpretable borehole image data having unidentified borehole image data;

b) examining one of the portion of the at least one interpretable borehole image data, the processed logging data or both to generate the unidentified borehole image data, then processing the generated unidentified borehole image data utilizing a multi-point statistics (MPS) algorithm FILTERSIM into the portion of the at least one interpretable borehole image data so as to generate fullbore image data;

c) collecting at least one core from the reservoir and generating 3-dimensional digital core data from the collected at least one core sample using a computed-tomographic scan (CTscan), the generated digital core data representing one of features or structures of one or more depth-defined interval of the reservoir;

d) pre-modeling the generated digital core data to define 3-dimensional sizes and shapes of petrophysical facies;

e) using a multi-point statistics (MPS) algorithm SNESIM to generate realizations of numerical pseudocores for two or more petrophysical facies, and conditioning the realizations to match petrophysical facies sizes and shapes observed in the generated fullbore image data and the generated pre-modeled 3-dimensional digital core data; and (f) resampling the numerical pseudocores of step (e) to a radial grid, wherein the radial grid provides for a flow investigation of the numerical pesudocore model and includes building a cylindrical grid having one of one or more shapes or one or more layers, resampling the numerical pseudocore model from Cartesian coordinates, each voxel of which has a constant porosity or a constant permeability according to an associated rock type of the voxel, to cylindrical coordinates, wherein each cylindrical cell includes multiple Cartesian voxels of the numerical pseudocore model.

2. The method of claim 1, wherein the portion of the at least one interpretable borehole image data is a training image that is two-dimensional (2D) scalar arrays of continuously variable numerical values.

3. The method of claim 1, wherein the portion of the at least one interpretable borehole image data comprises processed raw data that includes measured values and non-measured values.

4. The method of claim 1, wherein the unidentified borehole image data represents one of non-measured values of the portion of the at least one interpretable borehole image data or data gaps in the portion of the at least one interpretable borehole image data.

5. The method of claim 4, wherein the data gaps are from the group consisting of one of at least one damaged pad in the reservoir, at least one damaged area in the reservoir, at least one pad with inadequate pad pressure against a borehole wall in the reservoir, at least one pad obstructed from contacting the borehole wall in the reservoir or at least one inoperable pad in the reservoir.

6. The method of claim 1, wherein the other processed logging data is from the group consisting of one of logging-while-drilling data or wireline logging data, or some combination thereof.

7. The method of claim 6, wherein the wireline logging data includes at least one of gamma ray, density, sonic, neutron, caliper or resistivity logs.

8. The method of claim 1, wherein the at least one fullbore image data is one of two-dimensional (2D), three-dimensional (3D) or both.

9. The method of claim 1, wherein the generating at least one fullbore image consists of:
1) selecting a depth-defined interval of a borehole image log from the depth-defined intervals of the reservoir, processing the depth-defined interval of the borehole image log utilizing the multi-point statistics (MPS) algorithm FILTERSIM, wherein the MPS algorithm provides for a modeling capturing unidentified geological structures from the portion of the at least one interpretable borehole image data so as to identify data locations in the portion of the at least one interpretable borehole image data;
2) processing the identified data locations using filter scores to group and then simulate patterns in the unidentified borehole image data whereby the unidentified borehole image data represents one of non-measured values of the portion of the at least one interpretable borehole image or data gaps in the portion of the at least one interpretable borehole image;
3) identifying petrophysical facies of the reservoir, wherein the petrophysical facies is from the group consisting of one of fractures, pores, vugs, conductive patches of rocks in a borehole wall of the reservoir, resistive patches of rocks in the borehole wall of the reservoir, bed boundaries or a rock matrix; and
4) processing the unidentified borehole image data into the portion of the at least one interpretable borehole image so as to generate the at least one fullbore image, then with a known borehole diameter warping the at least one fullbore image into an original three-dimensional (3D) shape whereby the numerical pseudocore is conditioned so as to match one of the warped portion of the fullbore image or the portion of the at least one interpretable borehole image.

10. The method of claim 1, wherein the logging data is from the group consisting of one of logging data having multiple depths of investigation, analog models of core data from one or more reservoirs or some combination thereof.

11. The method of claim 1, wherein the 3-dimensional sizes and shapes of the petrophysical facies are from the group consisting of one of fractures, pores, vugs, porous patches of rocks in a borehole wall of the reservoir, electrically conductive patches of rocks in the borehole wall of the reservoir, electrically resistive patches of rocks in the borehole wall of the reservoir, bed boundaries or a rock matrix.

12. The method of claim 11, wherein pre-modeling the generated digital core data includes simulating via dilation of other petrophysical facies of the collected at least one core by a fixed number of voxels.

13. The method of claim 1, wherein the at least one core is collected from at least one other reservoir.

14. The method of claim 1, wherein a second core from the at least one core is obtained from one or more reservoirs.

15. The method of claim 1, wherein step (e) includes plotting a digital file of the generated realizations of the numerical pseudocore model onto one of a digital media or hard copy media.

16. The method of claim 1, wherein the radial grid provides for a flow investigation of the numerical pseudocore model and includes:
1) assigning each cylindrical cell in the cylindrical grid an average porosity and an average permeability based on the included multiple Cartesian voxels; and
2) assigning each cylindrical cell in the cylindrical grid relative permeability and capillary pressure curves based on the dominant rock type of the included multiple Cartesian voxels, using a reference table of one of capillary pressure, relative permeability or both for different facies in the numerical pseudocore that is fed into a flow simulator, whereby to quantify an impact of rock heterogeneity on fluid flow based on the pseudocore model referring to one of special core analysis (SCAL), mercury injection capillary pressure (MICP) data, pore network modeling or some combination thereof, of one or more core samples having the same rock type.

17. The method of claim 16, wherein the associated rock type is from the group consisting of one of fractures, pores, vugs, conductive patches of rocks in a borehole wall of the reservoir, resistive patches of rocks in the borehole wall of the reservoir, bed boundaries or a rock matrix.

18. The method of claim 1, further comprising:
g) performing flow simulations of one or more geographically associated reservoirs.

19. The method of claim 18, wherein performing flow simulations includes one of a single phase or multiphase flow, wherein the flow simulation is performed on the calculated numerical pseudocore model of step (f) so as to estimate one or more parameters.

20. The method of claim 19, wherein the one or more parameters are from the group consisting of porosity, permeability, capillary pressure, relative permeability, water cut, oil recovery factor or recovery efficiency.

21. The method of claim 18, further comprising:
conducting a sensitivity analysis on flow-related parameters, so as to determine a process for one of water flooding, gas flooding, steam flooding or enhanced oil recovery (EOR).

22. The method of claim 21, wherein the flow-related parameters are from the group consisting of porosity, permeability, capillary pressure, relative permeability, water cut, oil recovery factor or recovery efficiency.

23. The method of claim 18, further comprising:
determining a process for evaluating wettability effects in estimated parameters, wherein the estimated parameters includes one of capillary pressure, relative permeability, water cut, oil recovery factor or recovery efficiency.

24. The method of claim 1, further comprising:
performing flow simulations on the radial grid.

25. A method for creating a 3-dimensional numerical pseudocore model comprising:
a) obtaining logging data from a reservoir that includes depth-defined intervals of the reservoir, and processing the logging data into a portion of at least one interpretable borehole image data;
b) examining one of the portion of the at least one interpretable borehole image data, the processed logging data or both to generate at least one full-bore image data;
c) collecting at least one core from the reservoir and generating a digital core data using a computed-tomographic scan (CTscan) from the collected at least one core, the generated digital core data representing one of features or structures of one or more depth-defined interval of the reservoir;
d) pre-modeling the generated digital core data, to define the 3-dimensional sizes and shapes of the petrophysical facies;
e) using a multi-point statistics (MPS) algorithm SNESIM to generate realizations of numerical pseudocores for two or more petrophysical facies, and conditioning the realizations to match petrophysical facies sizes and shapes observed in the generated fullbore image data and the generated pre-modeled digital core data; and
f) resampling the numerical pseudocores of step (e) to a radial grid, wherein the radial grid provides for a flow investigation of the numerical pesudocore model and includes building a cylindrical grid having one of one or more shapes or one or more layers, resampling the numerical pseudocore model from Cartesian coordinates, each voxel of which has a constant porosity or a constant permeability according to an associated rock type of the voxel, to cylindrical coordinates, wherein each cylindrical cell includes multiple Cartesian voxels of the numerical pseudocore model.

26. The method of claim 25, wherein the portion of the at least one interpretable borehole image data is a training image that is two-dimensional (2D) scalar arrays of continuously variable numerical values.

27. The method of claim 25, wherein the other processed logging data is from the group consisting of one of logging-while-drilling data or wireline logging data, or some combination thereof.

28. The method of claim 25, wherein the logging data is from the group consisting of one of logging data having multiple depths of investigation or analog models of core data from one or more reservoirs or some combination thereof.

29. The method of claim 25, wherein the 3-dimensional sizes and shapes of the petrophysical facies are from the group consisting of one of fractures, pores, vugs, porous patches of rocks in a borehole wall of the reservoir, electrically conductive patches of rocks in the borehole wall of the reservoir, electrically resistive patches of rocks in the borehole wall of the reservoir, bed boundaries or a rock matrix.

30. The method of claim 29, wherein pre-modeling the generated digital core data includes simulating via dilation of other petrophysical facies of the collected at least one core by a fixed number of voxels.

31. A method for creating a 3-dimensional numerical pseudocore model comprising:
a) obtaining logging data from a reservoir that includes depth-defined intervals of the reservoir, and processing the logging data into a portion of at least one interpretable borehole image data having unidentified borehole image data;
b) examining one of the portion of the at least one interpretable borehole image data, the processed logging data or both to generate the unidentified borehole image data, then processing the generated unidentified borehole image data utilizing a multi-point statistics (MPS) algorithm into the portion of the at least one interpretable borehole image data so as to generate at least one warped fullbore image data;
c) collecting at least one core from the reservoir, and generating 3-dimensional core data from the collected at least one core using a computed-tomographic scan (CTscan), the generated digital core data representing one of features or structures of one or more depth-defined intervals of the reservoir;
d) pre-modeling a portion of the generated 3-dimensional digital core data, the portion of at least one interpretable borehole image data, portion of the logging data or some combination thereof, to generate realizations of the numerical pseudocore model;
wherein the generating of realization of the numerical pseudocore model includes using a multi-point statistics (MPS) algorithm SNESIM to generate realizations of numerical pseudocores for two or more facies, so as to condition the realizations to match facies sizes and shapes observed in the portion of the at least one interpretable borehole image of the portion of the generated 3-dimensional digital core data and the generated at least one warped fullbore image data; and
resampling the numerical pseudocores to a radial grid, wherein the radial grid provides for a flow investigation of the numerical pesudocore model and includes building a cylindrical grid having one of one or more shapes or one or more layers, resampling the numerical pseudocore model from Cartesian coordinates, each voxel of which has a constant porosity or a constant permeability according to an associated rock type of the voxel, to cylindrical coordinates, wherein each cylindrical cell includes multiple Cartesian voxels of the numerical pseudocore model.

* * * * *